United States Patent
Fukuda et al.

(10) Patent No.: US 9,906,320 B2
(45) Date of Patent: Feb. 27, 2018

(54) INDUSTRIAL NETWORK APPARATUS AND DATA COMMUNICATION METHOD

(71) Applicant: KABUSHIKI KAISHA YASKAWA DENKI, Kitakyushu-shi (JP)

(72) Inventors: Mamoru Fukuda, Kitakyushu (JP); Tatsuhiko Satou, Kitakyushu (JP); Naoya Taki, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 263 days.

(21) Appl. No.: 14/288,316

(22) Filed: May 27, 2014

(65) Prior Publication Data
US 2014/0355619 A1 Dec. 4, 2014

(30) Foreign Application Priority Data
May 29, 2013 (JP) .................................. 2013-113371

(51) Int. Cl.
 *H04J 3/24* (2006.01)
 *H04L 12/40* (2006.01)

(52) U.S. Cl.
 CPC .......... *H04J 3/242* (2013.01); *H04L 12/4015* (2013.01); *H04L 12/40156* (2013.01)

(58) Field of Classification Search
None
See application file for complete search history.

(56) References Cited

U.S. PATENT DOCUMENTS

| | | | | |
|---|---|---|---|---|
| 5,157,659 A | * | 10/1992 | Schenkel | H04L 12/407 370/447 |
| 2004/0170182 A1 | | 9/2004 | Higashida et al. | |
| 2009/0180478 A1 | * | 7/2009 | Yu | H04L 12/4633 370/395.1 |
| 2009/0248933 A1 | | 10/2009 | Fukuda et al. | |
| 2009/0303937 A1 | * | 12/2009 | Sawahashi | H04L 5/0064 370/329 |
| 2010/0080126 A1 | | 4/2010 | Higashida | |

(Continued)

FOREIGN PATENT DOCUMENTS

CN 1539221 10/2004
EP 2 453 613 5/2012
(Continued)

OTHER PUBLICATIONS

Extended European Search Report for corresponding EP Application No. 14169620.3-1862, dated Dec. 4, 2014.
(Continued)

*Primary Examiner* — Yaotang Wang
(74) *Attorney, Agent, or Firm* — Mori & Ward, LLP

(57) ABSTRACT

An industrial network apparatus includes: a control data communicator configured to transmit control data in a priority transmission period that occurs periodically; and a message data communicator configured to determine whether or not to start transmission of message data in a non-priority transmission period depending on a required transmission time of message data and remaining time of the non-priority transmission period that is different from the priority transmission period, and to transmit the message data when determining to start transmission of the message data.

24 Claims, 12 Drawing Sheets

(56) References Cited

U.S. PATENT DOCUMENTS

| | | | |
|---|---|---|---|
| 2011/0026538 A1* | 2/2011 | Takeuchi | H04L 49/251 370/401 |
| 2012/0120966 A1 | 5/2012 | Balasubramanian et al. | |
| 2012/0307829 A1* | 12/2012 | Hyoudou | H04L 47/17 370/392 |
| 2013/0128895 A1* | 5/2013 | Kirrmann | H04L 12/4015 370/412 |
| 2013/0182637 A1* | 7/2013 | Joo | H04W 52/0209 370/315 |
| 2014/0029625 A1* | 1/2014 | Edmiston | H04L 49/257 370/401 |

FOREIGN PATENT DOCUMENTS

| | | |
|---|---|---|
| EP | 2 579 511 | 4/2013 |
| JP | 2005-215936 | 8/2005 |
| WO | WO 2008/078585 | 7/2008 |

OTHER PUBLICATIONS

Fukuda et al., "Motion Field Network Mechatrolink-III" Yaskawa Denki Technical Report, Mar. 10, 2009, pp. 190-194, vol. 72, No. 4, Japan.

Japanese Office Action for corresponding JP Application No. 2013-113371, dated May 19, 2015.

Chinese Office Action for corresponding CN Application No. 201410228179.6, dated May 3, 2017 (w/ English machine translation).

* cited by examiner

INDUSTRIAL NETWORK APPARATUS AND DATA COMMUNICATION METHOD

CROSS-REFERENCE TO RELATED APPLICATION

This application claims priority from Japanese Patent Application No. 2013-113371 filed with the Japan Patent Office on May 29, 2013, the entire content of which is hereby incorporated by reference.

BACKGROUND

1. Technical Field

The present disclosure relates to an industrial network apparatus and a data transmission method.

2. Related Art

In a manufacturing system or a manufacturing apparatus, generally, N industrial devices (slaves) such as servo amplifiers or I/O devices are connected to an industrial network. These industrial devices communicate with a controller (a master) that controls them in a one-to-N manner (N≥1). In this case, a real-time exchange between a command (an instruction value; output data) from the master and a response (a current value; input data) from the slave is required between the master and each slave. Therefore, the master and the slave repeat the exchange of the input data and the output data within a predetermined period (a transmission cycle) so-called communication cycle or transmission cycle.

Here, the accuracy of the transmission cycle is required in motion control systems such as machine tools or chip mounters. This is because of the following reason. In the motion control systems, multiple devices such as servo drives are simultaneously operated synchronized with the transmission cycle. Therefore, the more accurate the transmission cycle is, the more the synchronization accuracy improves, which results in the improvement of the manipulation accuracy.

By the way, in manufacturing systems or manufacturing apparatus, the maintenance or engineering of the connected equipment is carried out in addition to the highly prioritized exchange of the input and output data executed by a fixed cycle. Thus, the manufacturing system or the manufacturing apparatus is required to perform the less prioritized, irregular data transmission (hereafter, referred to as "message transmission"). When such message transmission is executed, however, the band of the exchange of the input and output data may be affected, which is likely to make it difficult to ensure the real-time property. Furthermore, the simultaneous operation of the devices is likely to be disturbed due to the expanded transmission cycle.

It is noted that the art of performing the cyclic exchange of the input and output data and the message transmission without affecting the transmission cycle is known as an FL-net (OPCN-2) disclosed in Japanese Patent Application Laid-open No. 2005-215936. In the FL-net, the connected equipment that has been qualified for a transmission by a token pass simultaneously broadcasts the input data or the output data. When there is a margin in the remaining band of the transmission cycle, the message transmission is made. This allows for the real-time communication by a fixed cycle.

SUMMARY

An industrial network apparatus includes: a control data communicator configured to transmit control data in a priority transmission period that occurs periodically; and a message data communicator configured to determine whether or not to start transmission of message data in a non-priority transmission period depending on a required transmission time of message data and remaining time of the non-priority transmission period that is different from the priority transmission period, and to transmit the message data when determining to start transmission of the message data.

DETAILED DESCRIPTION

Figure 1:
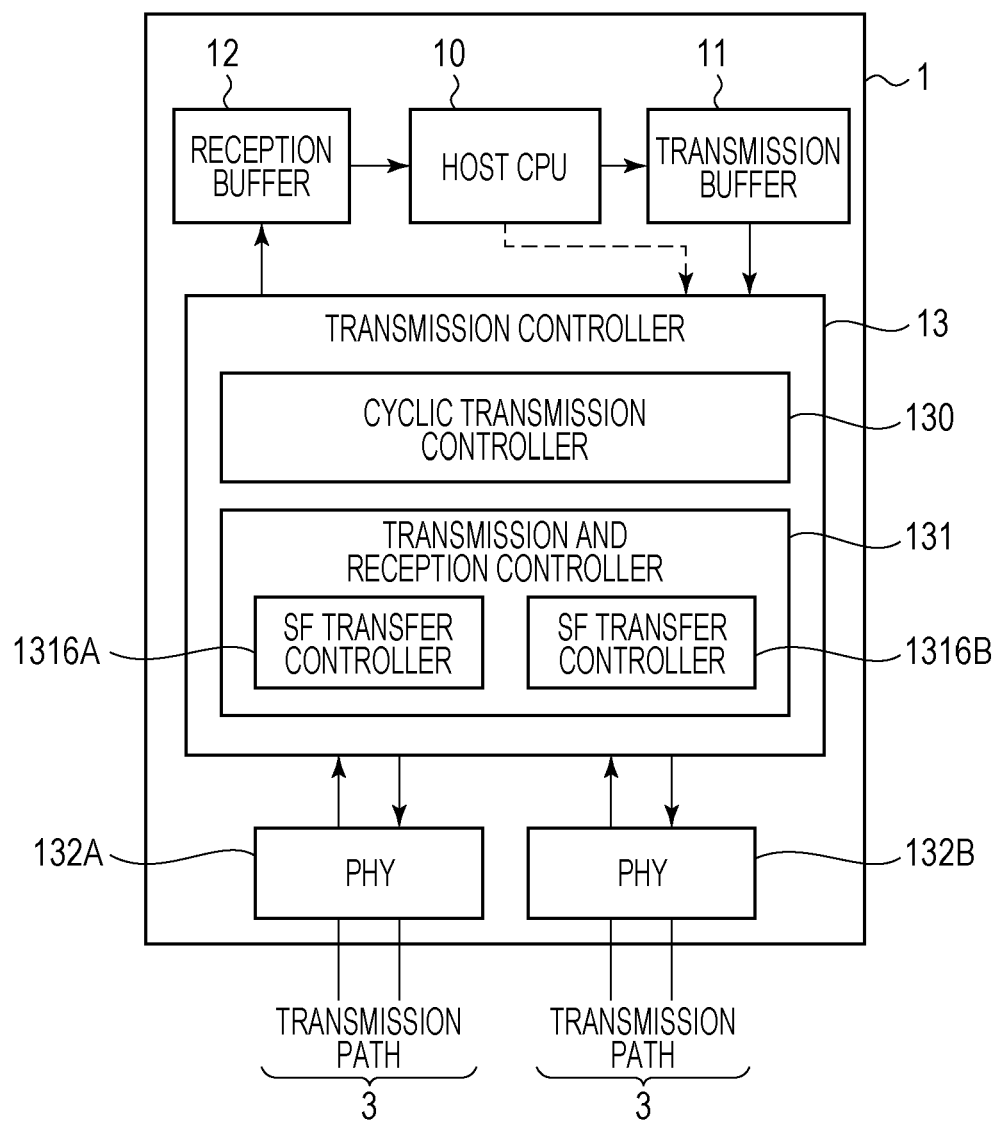
FIG. 1 is an entire configuration diagram of an industrial network apparatus used as an industrial device or a controller according to an embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

An industrial network apparatus according to one embodiment of the present disclosure includes: a control data communicator configured to transmit control data in a priority transmission period that occurs periodically; and a message data communicator configured to determine whether or not to start transmission of message data in a non-priority transmission period depending on a required transmission time of message data and remaining time of the non-priority transmission period that is different from the priority transmission period, and to transmit the message data when determining to start transmission of the message data.

The industrial network apparatus according to one embodiment of the present disclosure may be configured as follows. Specifically, the industrial network apparatus is connected to an industrial network together with a controller and another industrial device, the priority transmission period includes a first priority transmission period for transmitting control data from one of the controller and the industrial device addressed to the other, the non-priority transmission period includes a first non-priority transmission period for transmitting message data from one of the controller and the industrial device addressed to the other, the control data communicator includes a first control data relay configured to receive control data transmitted from one of the controller and the industrial device addressed to the other and transmit the control data addressed to the other in the first priority transmission period, the message data communicator includes a first message data relay configured to receive message data transmitted from the one of the controller and the industrial device addressed to the other and transmit the message data addressed to the other in the first non-priority transmission period, and the first message data relay determines whether or not to start transmission of the message data addressed to the other depending on a required transmission time of the message data and remaining time of the first non-priority transmission period.

The first control data relay may start the transmission of the control data addressed to the other before receiving the entire control data. For example, the first control data relay may transmit the control data by a cut-through method.

The first message data relay may start transmission of the message data addressed to the other after receiving the entire message data. For example, the first message data relay may transmit the message data by a store-and-forward method.

The message data may have a variable length.

In addition, an industrial network apparatus according to one embodiment of the present disclosure may include a synchronizer configured to synchronize the first priority transmission period and the first non-priority transmission period with respect to the controller.

Further, the industrial network apparatus according to one embodiment of the present disclosure may be configured as follows. Specifically, the priority transmission period includes a second priority transmission period for transmitting control data addressed to the one of the controller and the industrial device from the other, the non-priority transmission period includes a second non-priority transmission period for transmitting message data addressed to the one of the controller and the industrial device from the other, the control data communicator includes a second control data relay configured to receive control data addressed and transmitted to the one of the controller and the industrial device from the other and transmit the control data addressed to the one in the second priority transmission period, the message data communicator includes a second message data relay configured to receive message data addressed and transmitted to the one of the controller and the industrial device from the other and transmit the message data addressed to the one in the second non-priority transmission period, and the second message data relay determines whether or not to start transmission of the message data addressed to the one depending on a required transmission time of the message data and remaining time of the second non-priority transmission period.

The control data communicator and the message data communicator may transmit the control data and the message data by storing the control data or the message data in a frame transmitted by a common transmission medium.

Further, the industrial network apparatus according to one embodiment of the present disclosure may be configured as follows. Specifically, the industrial network apparatus is communicably connected to an industrial network together with a controller, the control data communicator includes a first control data transmitter configured to transmit the control data addressed to the controller in the priority transmission period, the message data communicator includes a first message data transmitter configured to transmit the message data addressed to the controller in the non-priority transmission period, and the first message data transmitter determines whether or not to start transmission of the message data addressed to the controller depending on a required transmission time of the message data and remaining time of the non-priority transmission period.

Further, the industrial network apparatus according to one embodiment of the present disclosure may be configured as follows. Specifically, the industrial network apparatus is communicably connected to an industrial network together with an industrial device, the control data communicator includes a second control data transmitter configured to transmit the control data addressed to the industrial device in the priority transmission period, the message data communicator includes a second message data transmitter configured to transmit the message data addressed to the industrial device in the non-priority transmission period, and the second message data transmitter determines whether or not to start transmission of the message data addressed to the industrial device depending on a required transmission time of the message data and remaining time of the non-priority transmission period.

In addition, in the industrial network apparatus according to one embodiment of the present disclosure, the message data communicator may transmit the message data when the required transmission time of the message data is less than or equal to the remaining time of the non-priority transmission period, and may hold the message data without transmitting the message data until the next first non-priority transmission period comes when the required transmission time of the message data is longer than the remaining time of the first non-priority transmission period.

Moreover, an industrial network apparatus according to another embodiment of the present disclosure may include:

control data communication means for transmitting control data in a priority transmission period that occurs periodically; and message data communication means for determining whether or not to start transmission of message data in a non-priority transmission period depending on a required transmission time of message data and remaining time of the non-priority transmission period that is different from the priority transmission period, and also transmitting the message data when determining to start transmission of the message data.

Further, a data communication method according to one embodiment of the present disclosure may include:

transmitting priority data in a priority transmission period that occurs periodically;

determining whether or not to start transmission of non-priority data in a non-priority transmission period depending on a required transmission time of non-priority data and remaining time of the non-priority transmission period that is different from the priority transmission period; and transmitting the non-priority data when determining to start transmission of the non-priority data.

A data communication method according to one embodiment of the present disclosure may be configured as follows. Specifically, the data communication method further includes:

receiving priority data transmitted from a first network node in the priority transmission period; and receiving non-priority data transmitted from the first network node in the non-priority transmission period, wherein the transmitting priority data includes transmitting the priority data addressed to a second network node, and the determining whether or not to start transmission of non-priority data in the non-priority transmission period includes determining whether or not to start transmission of non-priority data addressed to the second network node depending on a required transmission time of the non-priority data and remaining time of the non-priority transmission period.

A data communication method according to one embodiment of the present disclosure may be configured as follows. Specifically, the transmitting priority data includes transmitting priority data addressed to another network node in the priority transmission period, and the determining whether or not to start transmission of non-priority data in the non-priority transmission period includes determining whether or not to start transmission of the non-priority data addressed to another network node depending on a required transmission time of the non-priority data and remaining time of the non-priority transmission period.

The embodiment of the present disclosure will be described below in detail based on the drawings.

FIG. 1 is a diagram illustrating the configuration of an industrial network apparatus according to the embodiment of the present disclosure. The industrial network apparatus 1 illustrated in FIG. 1 is connected to a machine-controlling industrial network as an industrial device (a slave) such as a servo amplifier or an I/O device, or a controller (a master) that controls the industrial devices. The industrial network apparatus 1 is used as a network node of that industrial network. That is, a plurality of industrial network apparatus 1 are communicably connected in a form of the cascade type or the star type. The industrial network apparatus 1 has a function of receiving the data addressed to the self-node and the broadcast data, a function of generating by itself the data addressed to another node (including multicast data and broadcast data) and transmitting it, and a function of receiving the data addressed to another node (including the multicast data and the broadcast data) and transferring it to that another node.

The industrial network apparatus 1, when it does not function as a data transfer apparatus (data relay apparatus), does not have to have a function of receiving the data addressed to another node (including the multicast data and the broadcast data) and transferring it to that another node. In this case, the industrial network apparatus 1 may have at least one of a function of receiving the data addressed to the self-node and the broadcast data and a function of generating by itself the data addressed to another node and transmitting it.

Furthermore, the industrial network apparatus 1, when functioning as data transfer apparatus, has a function of receiving data addressed to another node and transferring it to that another node, whereas the apparatus does not have to have a function of receiving the data addressed to the self-node and the broadcast data nor a function of generating by itself the data addressed to another node and transmitting it.

Figure 2:
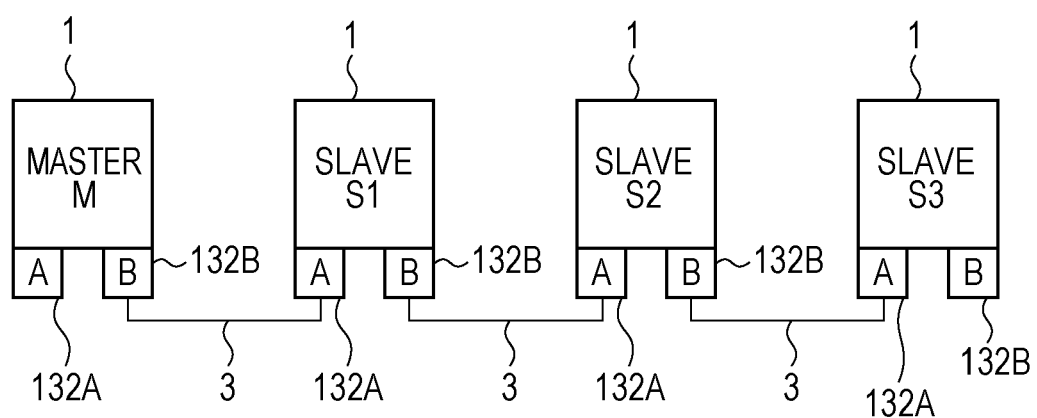
FIG. 2 is a diagram illustrating an example of the industrial network with a use of the industrial network apparatus according to the present embodiment.

FIG. 2 is a diagram illustrating a configuration example of the industrial network with the use of the industrial network apparatus 1. In the example illustrated in FIG. 2, there are one industrial network apparatus 1 which functions as a master M and three industrial network apparatuses 1 function as slaves S1 to S3 connected by transmission paths 3 in a cascade manner.

Specifically, the industrial network apparatus 1 has two communication interfaces 132 A and 132B. The communication interface 132B of the industrial network apparatus 1 that is the master M and the communication interface 132A of the industrial network apparatus 1 that is the most upstream slave S1 are connected to each other. Further, the communication interface 132B of the industrial network apparatus 1 that is the slave S1 and the communication interface 132A of the industrial network apparatus 1 that is the downstream slave S2 are connected to each other. Furthermore, the communication interface 132B of the industrial network apparatus 1 that is the slave S2 and the communication interface 132A of the industrial network apparatus 1 that is the most downstream slave S3 are connected to each other.

When the slave S3 transmits data to the master M, the slave S2 and the slave S1 sequentially relay the data, respectively. It is noted that the master M that is the end node and the industrial network apparatus 1 that is used as the slave S3 does not have to have the above-described transferring function.

Here, the industrial network is configured with the Ethernet (TM, ISO/IEC 8802-3), for example. Further, examples of the data transmitted in the industrial network include commands (instruction values; output data) serving as control data transmitted from the master M to the slaves S1, S2, and S3, responses (current values; input data) serving as control data transmitted from the slaves S1, S2, and S3 to the master M, message data transmitted from the master M to the slaves S1, S2, and S3, and message data transmitted from the slaves S1, S2, and S3 to the master M.

When each of the slaves S1 to S3 is the input-only I/O device such as a sensor, the command may include a request for the current value and the response may include the current value that is being obtained by the slaves S1 to S3. In addition, when each of the slaves S1 to S3 is the servo drive, the command may include a control target value such as a target position or a target torque and the response may include a current value such as the current position or the current torque that is being obtained by the slaves S1 to S3. The exchange of the command and the response between the master M and the slaves S1 to S3 is executed by a fixed cycle. On the other hand, the message data from the master M or the slaves S1, S2, and S3 is the data having a variable length (any size) that is transmitted for the purpose of the maintenance or the engineering of the network node. This message data is transmitted at any timing (irregularly). The exchange of the command and the response may be executed at a more accurate and shorter cycle for the improvement of the accuracy in the machine control.

Figure 3:
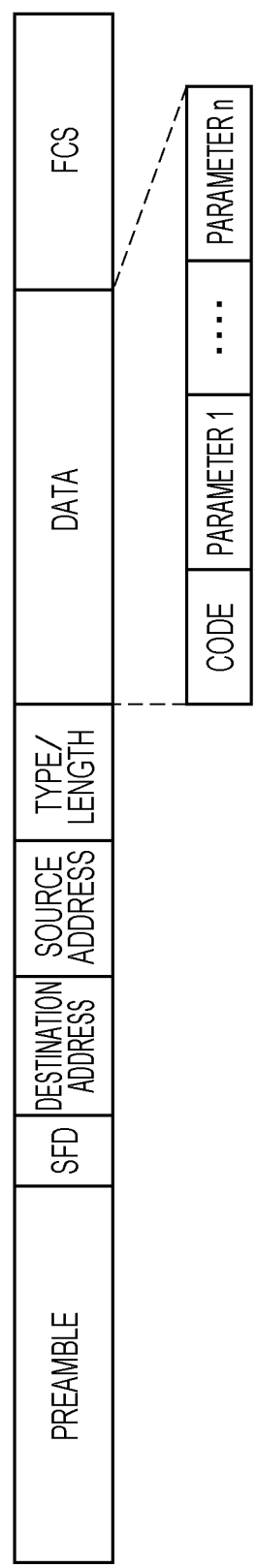
FIG. 3 is a diagram illustrating a configuration example of a transmission frame.

It is noted that the data transmitted by the industrial network is stored in the frame conforming to the Ethernet. As illustrated in FIG. 3, the frame conforming to the Ethernet includes a preamble field, a frame start identifier field (SFD: Start Frame Delimiter), a destination address field, a source address field, a type/length field, a data field, and an error check field (FCS: Frame Check Sequence). In particular, the data field includes a code field indicating the type of the data. The code field indicates which type of data such as the command (the output data), the response (the input data), the message data, or the synchronization notification as described above, the data stored in parameter 1 to parameter n is categorized in.

As illustrated in FIG. 1, the industrial network apparatus 1 has a host CPU (Central Processing Unit) 10, a transmission buffer 11, a reception buffer 12, a transmission controller 13, and the communication interfaces (PHY) 132A and 132B. The communication interfaces (PHY) 132A and 132B are connected to the separate physical transmission paths 3, respectively. In the present embodiment, the transmission paths 3 are the data communication lines that are capable of full duplex communication. The communication interfaces 132A and 132B are connected to the communication interfaces 132A and 132B of another node via the separate transmission paths 3, and transmit and receive the data to and from respective nodes. The host CPU 10 executes various kinds of data processing. The host CPU 10 generates the output data such as the command transmitted from the master M to the slaves S1, S2, and S3 or the input data such as the response transmitted from the slaves S1, S2, and S3 to the master M. Further, the host CPU 10 executes the data processing for machine control based on the received input data and/or the output data.

The transmission controller 13 controls the data transmission and reception of the industrial network apparatus 1. The transmission controller 13 includes a cyclic transmission controller 130 and a transmission and reception controller 131. In the present embodiment, a control data communicator, a first and a second control data relays, a first and a second control data transmitters, and control data communication means can correspond to a transmission and reception controller 131.

The cyclic transmission controller 130 determines the communication band (a communication period) and the data transfer control method. On the other hand, the transmission and reception controller 131 is connected to the communication interfaces 132A and 132B. The transmission and reception controller 131 switches the transfer control method according to the instruction from the cyclic transmission controller 130.

Specifically, the transmission and reception controller 131 transfers the data of the command and the response by a cut-through method in a priority transmission period (a first or second priority transmission period) that occurs periodically (for example, at a fixed cycle). Further, the transmission and reception controller 131 includes store-and-forward transfer controllers 1316A and 1316B. The transmission and reception controller 131 transfers the message data by a store-and-forward method in a non-priority transmission period (a first or second non-priority transmission period) that is different from the priority transmission period.

In the present embodiment, a message data communicator, first and second message data relays, first and second message data transmitters, and message data communication means can correspond to a store-and-forward transfer controller 1316A and 1316B.

The transmission and reception controller 131 of the present embodiment includes store-and-forward transfer controllers 1316A and 1316B, which contribute to its function. Therefore, in the present embodiment, a message data communicator, first and second message data relays, first and second message data transmitters, and message data communication means can correspond to the transmission and reception controller 131.

In the data transmission by the cut-through method, the industrial network apparatus 1 starts transferring the control data upon receiving the destination address stored in the header field of the control data. That is, before receiving the entire control data, the industrial network apparatus 1, which is the relay node, starts transferring the control data by the communication interfaces 132A and 132B having a node designated by the destination address. In the present embodiment, the industrial network apparatus 1 is provided with two communication interfaces. Therefore, the industrial network apparatus 1 may be simply configured so that one of the communication interfaces 132A and 132B which has received the control data transfers the received control data to the other communication interface. When three or more communication interfaces are provided, the industrial network apparatus 1 stores in advance a table that associates each communication interface with the destination address. Then, the industrial network apparatus 1 may determine which of the more than three communication interfaces has the node designated by the destination address included in the control data. It is noted that, in the data transmission by the cut-through method, the industrial network apparatus 1 may be configured so as to start transferring the control data upon receiving the data other than the destination address. For example, when the destination address is known, or when the control data is transmitted to all the slaves S1 to S3 regardless of the destination address, the industrial network apparatus 1 of the master M may start transferring the control data upon receiving the data followed by the destination address in the header field of the control data (for example, the SFD (see FIG. 3)).

On the other hand, after receiving the entire message data sent out from the master M or the slaves S1, S2, and S3, the store-and-forward transfer controllers 1316A and 1316B calculate the required transmission time of that message data. It is noted that the required transmission time of the message data is the estimated time period from the time when the concerned industrial network apparatus 1 starts sending out the message data to the time when the reception of the entire message data is completed by another directly connected industrial network apparatus 1. The store-and-forward transfer controllers 1316A and 1316B then restrict the transferring of the message data depending on the required transmission time of the obtained data and the remaining time of the non-priority transmission period. That is, the store-and-forward transfer controllers 1316A and 1316B determine whether or not to start the transfer (transmission) of the message data depending on the required transmission time of the data and the remaining time of the non-priority transmission period. The transfer of the message data is performed when the destination address of the message data does not match the address of the self-node.

Specifically, when the required transmission time is less than or equal to the remaining time of the non-priority transmission period, the store-and-forward transfer controllers 1316A and 1316B start the transmission (transfer) of the message data. In contrast, when the required transmission time is longer than the remaining time of the non-priority transmission period, the store-and-forward transfer controllers 1316A and 1316B do not transfer the message data and hold the message data until the next non-priority transmission period comes. Then, when the next non-priority transmission period comes, the store-and-forward transfer controllers 1316A and 1316B again compare the required transmission time and the remaining time of the non-priority transmission period. When the required transmission time is less than or equal to the remaining time of the non-priority transmission period, the store-and-forward transfer controllers 1316A and 1316B then transfer the message data held by themselves. Further, when the required transmission time is longer than the remaining time of the non-priority transmission period, the store-and-forward transfer controllers 1316A and 1316B hold the message data until the further next non-priority transmission period comes. For example, the required transmission time is calculated based on the (known) transmission rate of the industrial network and the data size of the message data (the data size of the entire frame). This restrains the situation where the transmission of the message would otherwise disturb the communication of the control data such as the command and the response. This allows the data exchange of the command and the response to be executed with a short and constant cycle.

The store-and-forward transfer controller 1316A is connected to the communication interface 132A. The store-and-forward transfer controller 1316A temporarily holds the message data that is generated by the self-node and is addressed and transmitted to the node in the communication interface 132A side and the message data addressed to another node that has been received by the communication interface 132B. The store-and-forward transfer controller 1316A then sends out that message data from the communication interface 132A depending on the required transmission time of the data and the remaining time of the non-priority transmission period. The store-and-forward transfer controller 1316B is connected to the communication interface 132B. The store-and-forward transfer controller 1316B temporarily holds the message data that is generated by the self-node and is addressed and transmitted to the node in the communication interface 132B side and the message data addressed to another node that has been received by the communication interface 132A. The store-and-forward transfer controller 1316B then sends out that message data from the communication interface 132B depending on the required transmission time of the data and the remaining time of the non-priority transmission period.

The communication interfaces 132A and 132B are connected to the separate physical transmission paths 3, respectively. The communication interfaces 132A and 132B convert the transmission data into the signals of a predetermined form and output them to the transmission paths 3. Further, the communication interfaces 132A and 132B convert the signals input from the transmission paths 3 into the received data.

Figure 4:
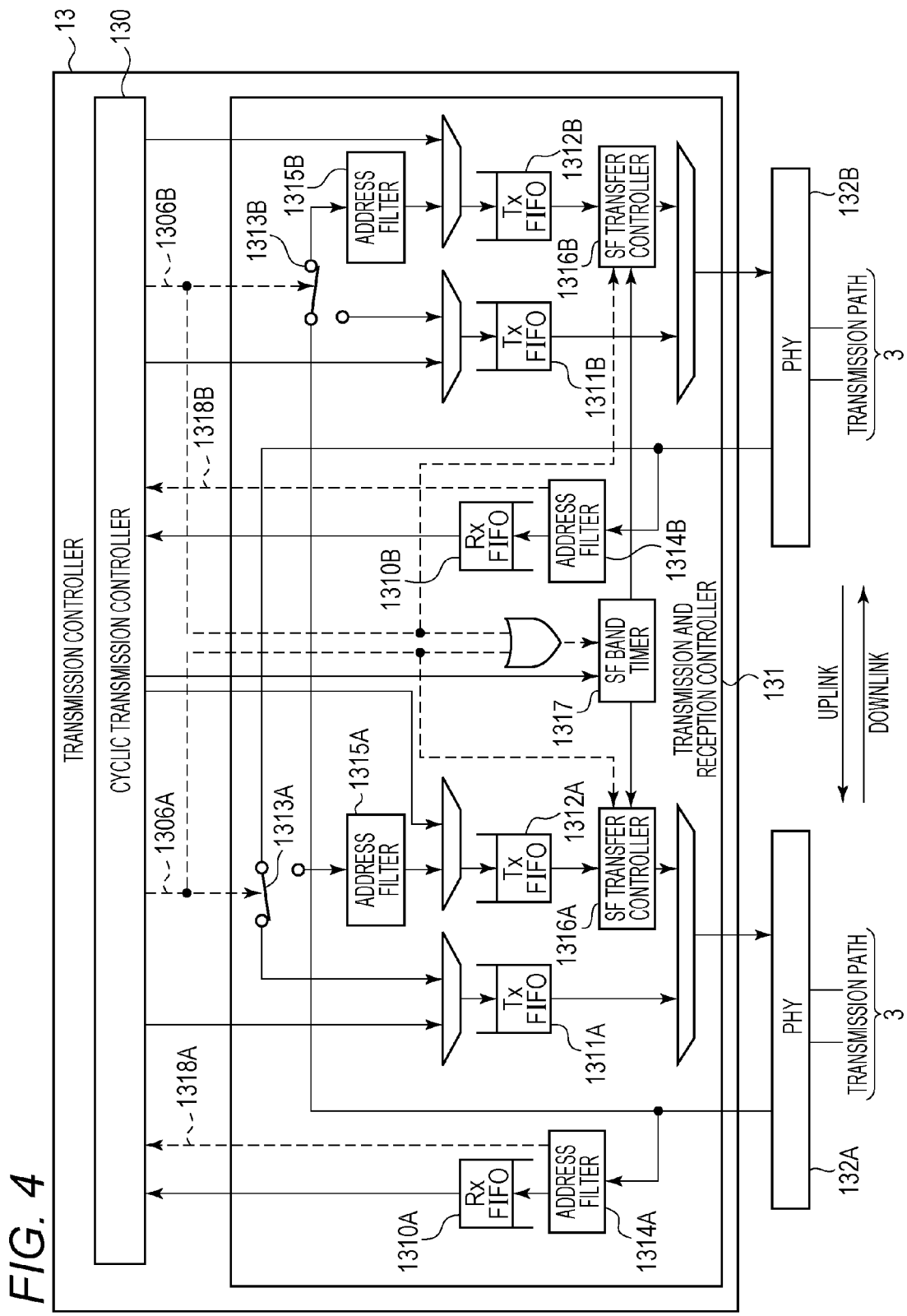
FIG. 4 is a block diagram illustrating a detailed configuration of a transmission and reception controller.
Figure 5:
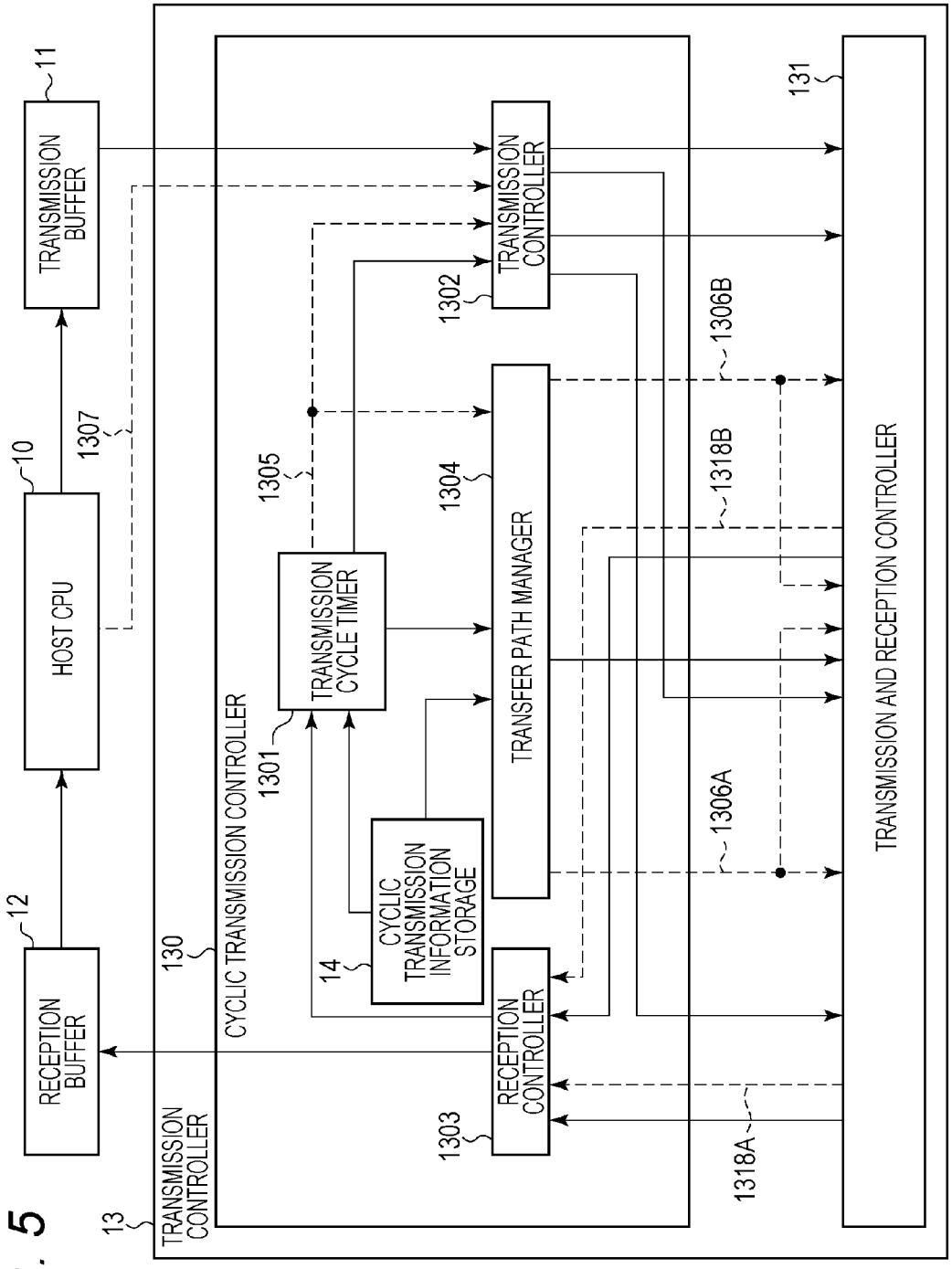
FIG. 5 is a block diagram illustrating a detailed configuration of a cyclic transmission controller.

Here, further detailed description will be provided as for the cyclic transmission controller 130 and the transmission and reception controller 131. FIG. 4 is a block diagram illustrating in detail the transmission and reception controller 131. FIG. 5 is a block diagram illustrating in detail the cyclic transmission controller 130.

As described above, the communication interfaces 132A and 132B are connected to the transmission and reception controller 131. When viewed from respective communication interfaces 132A and 132B, each industrial network apparatus 1 has substantially the same configuration. Therefore, in the following description, the configuration of the data transmission and reception by the communication interface 132A of the industrial network apparatus 1 will be described in detail by referring to FIG. 4 and FIG. 5. With respect to the configuration of the data transmission and reception by the communication interface 132B, the corresponding reference numerals are provided in FIG. 4 and FIG. 5 and their detailed descriptions will be omitted.

Firstly, described will be the configuration related to the flow of the data received by the communication interface 132A of the transmission and reception controller 131. As illustrated in FIG. 4, the transmission and reception controller 131 has internal paths that transmit the data received by the communication interface 132A. The first path is a path for transferring the received data to the cyclic transmission controller 130. The first path is a path interposing a FIFO (First-In First-Out) reception buffer 1310A. The second path is a path for relaying the data by the cut-through method by the communication interface 132B. The second path is a path interposing a FIFO transmission buffer 1311B. The third path is a path for relaying the data by the store-and-forward method by the communication interface 132B. The third path is a path interposing a FIFO transmission buffer 1312B.

It is noted that the message data that is generated by the self-node and is addressed and transmitted to the node of the communication interface 132B side is also input to the transmission buffer 1312B. Further, the control data that is generated by the self-node and is addressed and transmitted to the node of the communication interface 132B side is also input to the transmission buffer 1311B.

There is an address filter 1314A provided in the front stage of the reception buffer 1310A provided on the first path. The address filter 1314A passes the data having the destination address which matches the self-node address or the broadcast address.

It is noted that, upon receiving the data having the destination address which matches the self-node address or the broadcast address, the address filter 1314A outputs a reception notification signal 1318A to the cyclic transmission controller 130.

Further, there is an address filter 1315B connected in the front stage of the transmission buffer 1312B provided on the third path. The address filter 1315B passes, via a selector, the data having the destination address which does not match the self-node address. Therefore, for the data having the destination address which matches the self-node address, no data is transferred by the store-and-forward method. In contrast, for the data having the destination address which matches other-node address or the broadcast address, the data is transferred by the store-and-forward method. Here, the selector is a circuit that has multiple input terminals and one output terminal. The selector outputs, from the common output terminal, the data input from any of the input terminals.

Further, there is a transfer path switch 1313B provided in the front stage of the address filter 1315B. The transfer path switch 1313B is a switch for selecting either one of the cut-through method (the second path) or the store-and-forward method (the third path). The address filter 1315B is connected to one of the output terminals of the transfer path switch 1313B. The transmission buffer 1311B is connected to the other output terminal of the transfer path switch 1313B via the selector. The input terminal of the transfer path switch 1313B is input with the received data. To the transfer path switch 1313B, an SF path enable signal 1306B as the switching signal is input from the cyclic transmission controller 130. When the SF path enable signal 1306B is in an on state, the transfer path switch 1313B then selects the third path (the store-and-forward method). When the SF path enable signal 1306B is in an off state, the transfer path switch 1313B then selects the second path (the cut-through method).

Further, the store-and-forward transfer controller 1316B is connected in the later stage of the transmission buffer 1312B. The store-and-forward transfer controller 1316B checks the data length of the transmission data stored in the transmission buffer 1312B. The store-and-forward transfer controller 1316B then calculates, from the check result, the required time for transferring the transmission data to the neighboring network node via the communication interface 132B. When the time (the required transmission time) is less than or equal to the remaining time of the non-priority transmission period output by a store-and-forward band timer 1317, the store-and-forward transfer controller 1316B then extracts the transmission data from the transmission buffer 1312B and passes it to the communication interface 132B. This allows the store-and-forward transfer controller 1316B to start the transmission of the data stored in the transmission buffer 1312B. When the store-and-forward transfer controller 1316B is input with the SF path enable signal 1306B and the SF path enable signal 1306B is in the on state, the store-and-forward transfer controller 1316B performs the above-described operation.

The store-and-forward band timer 1317 outputs the remaining time of the band (non-priority transmission period) for the data transmission by the store-and-forward method, as described above. Therefore, non-priority transmission time A and non-priority transmission time B are input to the store-and-forward band timer 1317 from the cyclic transmission controller 130. The non-priority transmission time A indicates the length of the period for the data transmission (the uplink communication) from the communication interface 132A by the store-and-forward method. The non-priority transmission time B indicates the length of the period for the data transmission (the downlink communication) from the communication interface 132B by the store-and-forward method.

Further, the SF path enable signal 1306B for switching the transfer path switch 1313B is input to an OR circuit along with an SF path enable signal 1306A for switching a transfer path switch 1313A. The output signal from the OR circuit is input to the store-and-forward band timer 1317 as the signal indicating the start and stop of the timing.

Specifically, the cyclic transmission controller 130 turns on the SF path enable signal 1306B in switching the transfer path to the store-and-forward path (the third path). Further, the cyclic transmission controller 130 turns off the SF path enable signal 1306B in switching it to the cut-through method. The same applies to the SF path enable signal 1306A. The store-and-forward band timer 1317 then starts timing when any of the signals of the SF path enable signal 1306A and the SF path enable signal 1306B are in the on state, while stops timing when both signals are in the off state.

Further, the non-priority transmission time A associated with the store-and-forward transfer controller 1316A and the non-priority transmission time B associated with the store-and-forward transfer controller 1316B are held by the store-and-forward band timer 1317. The store-and-forward band timer 1317 calculates the difference between the time indicated by the non-priority transmission time A and the current time. This allows the store-and-forward band timer 1317 to obtain the remaining time in which the data transmission by the store-and-forward method from the communication interface 132A can be made. The store-and-forward band timer 1317 then supplies the calculation result of the remaining time to the store-and-forward transfer controller 1316A. Similarly, the store-and-forward band timer 1317 calculates the difference between the time indicated by the non-priority transmission time B and the current time. This allows the store-and-forward band timer 1317 to obtain the remaining time in which the data transmission by the store-and-forward method from the communication interface 132B can be made. The store-and-forward band timer 1317 then supplies the calculation result of the remaining time to the store-and-forward transfer controller 1316B.

Figure 7:
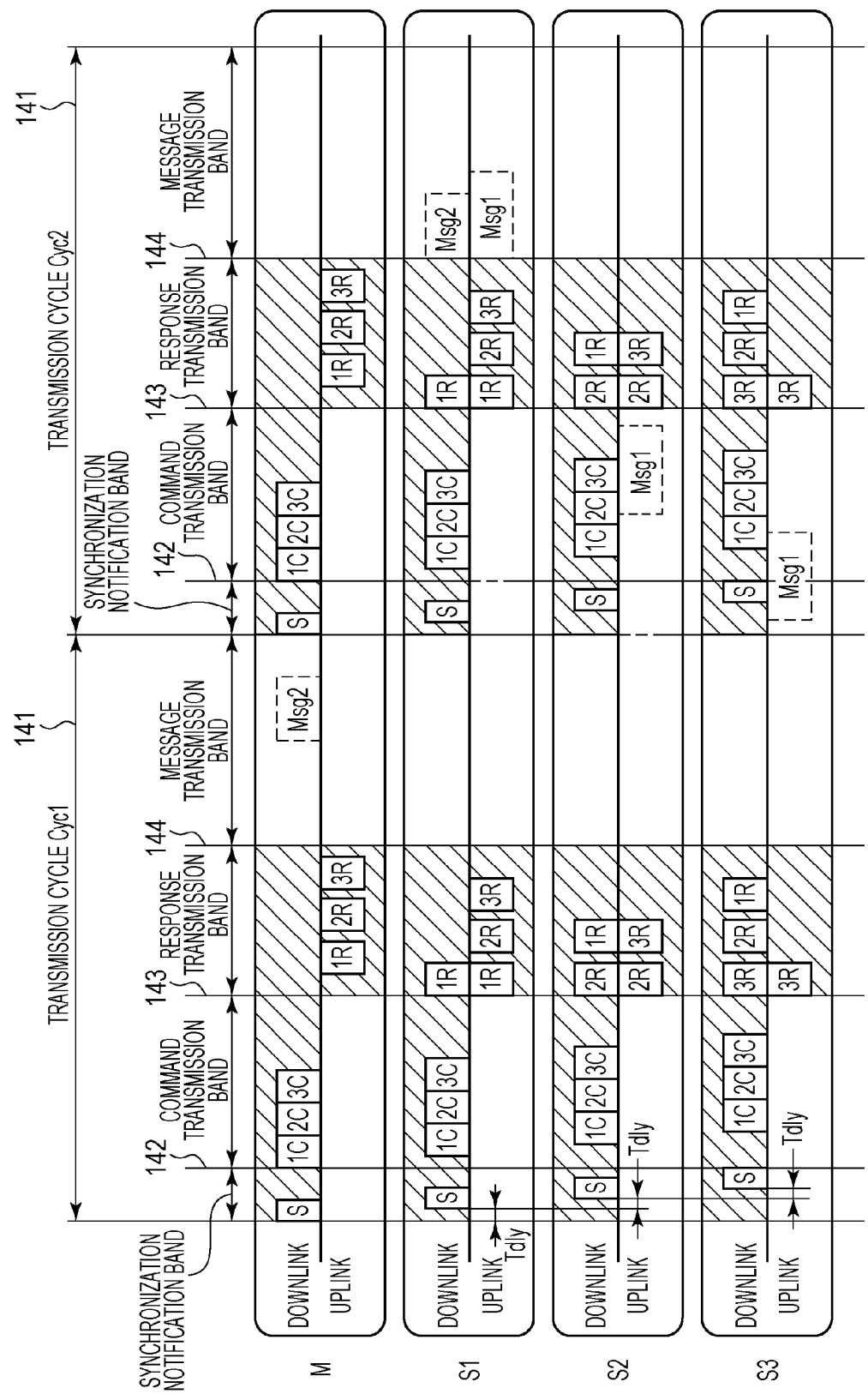
FIG. 7 is a timing chart illustrating data transmission in the industrial network according to FIG. 2.

It is noted that, in the timing chart illustrated in FIG. 7, the hatched area indicates the band in which the cut-through communication is made. That is, for the uplink communication (the communication from the slaves S1, S2, and S3 to the master M), the cut-through communication is made in a response transmission band (a first priority transmission period). The store-and-forward communication is made in a message transmission band, a synchronization notification band, and a command transmission band (a first non-priority transmission period). On the other hand, for the downlink communication (the communication from the master M to the slaves S1, S2, and S3), the cut-through communication is made in the synchronization notification band, the command transmission band, and the response transmission band (a second priority transmission period). The store-and-forward communication is made in the message transmission band (second non-priority transmission period). Therefore, both transfer path switches 1313A and 1313B switch themselves to the store-and-forward paths at the timing of message transmission start time 144 in each transmission cycle. In response, the store-and-forward band timer 1317 starts timing. That is, the store-and-forward band timer 1317 starts timing at the message transmission start time 144 that is the start timing of the non-priority transmission period of the uplink (the first non-priority transmission period) and also the start timing of the non-priority transmission period of the downlink (the second non-priority transmission period). Further, at the start timing of the next transmission cycle (the start timing of the synchronization notification band), the transfer path switch 1313B (downlink) switches itself to the cut-through path. Furthermore, at the timing of response transmission start time 143 of the next transmission cycle, the transfer path switch 1313A (uplink) switches itself to the cut-through path. In response, the store-and-forward band timer 1317 stops timing.

In the store-and-forward band timer 1317, the time from the timing of the message transmission start time 144 to the timing of the response transmission start time 143 of the next transmission cycle is stored as the non-priority transmission time A (for the control of the uplink communication). The store-and-forward band timer 1317 then supplies, to the store-and-forward transfer controller 1316A, the value obtained by subtracting the current time obtained by the store-and-forward band timer 1317 from the non-priority transmission time A as the remaining time. Further, the time from the timing of the message transmission start time 144 to the start timing of the next transmission cycle (the time of the message transmission band) is stored by the store-and-forward band timer 1317 as the non-priority transmission time B (for the control of the downlink communication). The store-and-forward band timer 1317 then supplies, to the store-and-forward transfer controller 1316B, the value obtained by subtracting the current time obtained by the store-and-forward band timer 1317 from the non-priority transmission time B as the remaining time. It is noted that the store-and-forward band timer 1317 may be configured to start timing at other timing than the message transmission start time 144. Furthermore, the store-and-forward band timer 1317 may be configured to hold, by the store-and-forward band timer 1317, the time indicating the end timing of the non-priority transmission period in the uplink communication and the downlink communication. In this case, the store-and-forward band timer 1317 may output the difference between the held time and the current time as the remaining time.

Next, described will be the configuration related to the flow of the data requested to be transmitted via the communication interface 132A from the cyclic transmission controller 130. The transmission and reception controller 131 has FIFO transmission buffers 1311A and 1312A. The transmission buffer 1311A transfers the control data to be transmitted by the cut-through method, such as the output data of the master M or the input data of the slaves S1 to S3, to the communication interface 132A from the cyclic transmission controller 130. The transmission buffer 1312A transfers the message data to be transmitted by the store-and-forward method to the communication interface 132A. Each of the transmission buffers 1311A and 1312A has substantially the same configuration as the corresponding transmission buffers 1311B and 1312B provided in the communication interface 132B side as already described. Upon being stored in the transmission buffer 1311A or 1312A, the transmission data supplied from the cyclic transmission controller 130 is transmitted from the communication interface 132A side by the cut-through method or the store-and-forward method.

Next, the configuration of the cyclic transmission controller 130 will be described. As illustrated in FIG. 5, the cyclic transmission controller 130 includes a transmission cycle timer 1301, a transmission controller 1302, a reception controller 1303, a transfer path manager 1304, and a cyclic transmission information storage 14. The transmission cycle timer 1301 is a timer that times the transmission cycle. The transmission controller 1302 passes the control data (the command or the response) stored in the transmission buffer 11 or the message data to the transmission and reception controller 131 according to a timing signal 1305 output from the transmission cycle timer 1301. Further, the reception controller 1303 stores the control data or the message data in the reception buffer 12 in order to receive the received data from the transmission and reception controller 131 and pass it to the host CPU 10.

Further, the transfer path manager 1304 outputs the SF path enable signals 1306A and 1306B to the transmission and reception controller 131. The SF path enable signals 1306A and 1306B switch respective transfer paths for the uplink and the downlink according to the timing signal 1305 output from the transmission cycle timer 1301. Specifically, when switching the transfer path to the path where the cut-through method is applied to the transfer method of the relay path, the transfer path manager 1304 turns off the SF path enable signals 1306A and 1306B. On the other hand, when switching the transfer path to the path where the store-and-forward method serves as a transfer method, the transfer path manager 1304 turns on the SF path enable signals 1306A and 1306B.

Figure 6:
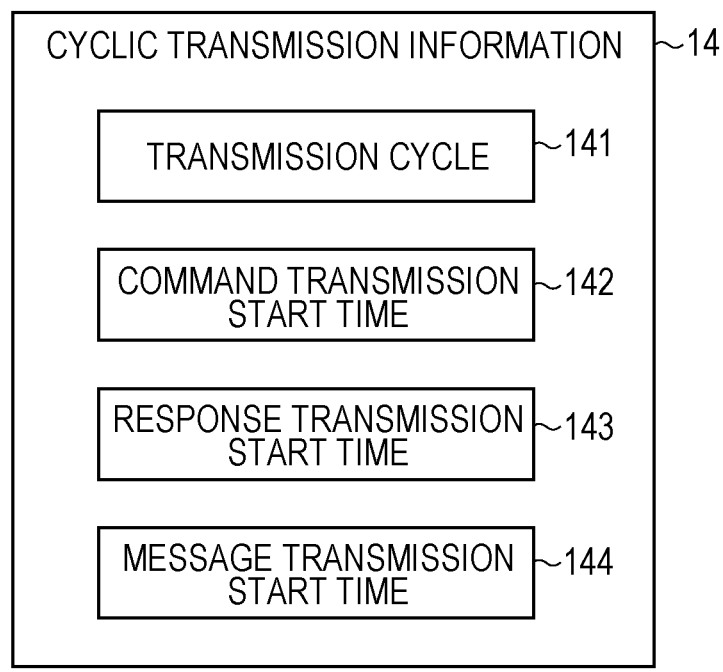
FIG. 6 is a diagram illustrating an example of cyclic transmission information stored in the cyclic transmission controller.

Further, the cyclic transmission information storage 14 stores cyclic transmission information. As illustrated in FIG. 6, the cyclic transmission information includes a transmission cycle 141, a command transmission start time 142, a response transmission start time 143, and a message transmission start time 144. As illustrated in FIG. 7, each transmission cycle includes, in the following order, a synchronization notification band (period) for transmitting the synchronization data, a command transmission band (period) for transmitting the command from the industrial network apparatus 1 of the master M, a response transmission band (period) for transmitting the response from the industrial network apparatus 1 of the slave S, and a message transmission band (period) for transmitting the message data from the master M or the slave S. The transmission cycle 141 indicates the length of one transmission cycle. The command transmission start time 142 indicates the time period from the start timing of the transmission cycle 141 to the start timing of the command transmission band. The response transmission start time 143 indicates the time period from the start timing of the transmission cycle 141 to the start timing of the response transmission band. The message transmission start time 144 indicates the time period from the start timing of the transmission cycle 141 to the start timing of the message transmission band.

The transmission cycle timer 1301 is auto-reloaded (automatically restarted) after the time is up. That is, the transmission cycle timer 1301 starts timing from zero and, at the time indicated by the transmission cycle 141, outputs the timing signal 1305 and again starts timing from zero. Further, at the time indicated by the command transmission start time 142, the response transmission start time 143, and the message transmission start time 144, the transmission cycle timer 1301 outputs the timing signal 1305 indicating that respective timings have come.

At this time, the cyclic transmission controller 130 of the industrial network apparatus 1 of the master M transmits the synchronization notification S in the synchronization notification band of each transmission cycle according to the transmission cycle timer 1301. On the other hand, the cyclic transmission controller 130 of the industrial network apparatus 1 of the slave S receives the synchronization notification S to correct its own transmission cycle timer 1301. Thereby, the cyclic transmission controller 130 of the industrial network apparatus 1 of the slave S synchronizes its own transmission cycle timer 1301 with the transmission cycle timer 1301 of the industrial network apparatus 1 of the master M. In the present embodiment, a synchronizer can correspond to the cyclic transmission controller 130.

For example, the synchronization notification S may include the current time (the transmission time of the synchronization notification S) of the industrial network apparatus 1 of the master M. Further, the industrial network apparatus 1 of the slaves S1 to S3 may hold, in advance, transmission delay time Tdly occurring between the nodes (see FIG. 7). The transmission delay time Tdly is measured in advance by some known method. In this case, the slave S1 compares the current time with the time obtained by adding the transmission delay time Tdly to the time contained in the synchronization notification S. The slave S1 then corrects the transmission cycle timer 1301 so that the difference of the time becomes zero. The slave S2 compares the current time with the time obtained by adding twofold of the transmission delay time Tdly to the time contained in the synchronization notification S. The slave S2 then corrects the transmission cycle timer 1301 so that the difference of the time becomes zero. The slave S3 compares the current time with the time obtained by adding threefold of the transmission delay time Tdly to the time contained in the synchronization notification S. The slave S3 then corrects the transmission cycle timer 1301 so that the difference of the time becomes zero. Alternatively, the industrial network apparatus 1 of the slaves S1 to S3 may hold transmission delay time Tdly1 to Tdly3 from the industrial network apparatus 1 of the master M, respectively. In this case, the slaves S1 to S3 compare the current time with the time obtained by adding the transmission delay time Tdly1 to Tdly3 to the time contained in the synchronization notification S. The slaves S1 to S3 then correct the transmission cycle timer 1301 so that the difference of the time becomes zero. As discussed above, the present embodiment is able to synchronize the master M with the slaves S1 to S3.

In the configuration example of the industrial network of FIG. 2, the path on which the command is transmitted from the master M to the slaves S1, S2, and S3 is the downstream. On the other hand, the path on which the response is transmitted from the slaves S1, S2, and S3 to the master M is the upstream. In respective inside of the slave S1 and the slave S2, the relay path on which the data received by the communication interface 132A is transmitted from the communication interface 132B is the downstream. On the other hand, the relay path on which the data received by the communication interface 132B is transmitted from the communication interface 132A is the upstream. These paths will be described using FIG. 4 in further detail. The downlink relay path when the cut-through method is used for the transfer is the path that passes the communication interface 132A, the transfer path switch 1313B, the transmission buffer 1311B, and the communication interface 132B in this order. The downlink relay path when the store-and-forward method is used for the transfer is the path that passes the communication interface 132A, the transfer path switch 1313B, the address filter 1315B, the transmission buffer 1312B, the store-and-forward transfer controller 1316B, and the communication interface 132B in this order. Similarly, the uplink relay path when the cut-through method is used for the transfer is the path that passes the communication interface 132B, the transfer path switch 1313A, the transmission buffer 1311A, and the communication interface 132A in this order. Further, the uplink relay path when the store-and-forward method is used for the transfer is the path that passes the communication interface 132B, the transfer path switch 1313A, the address filter 1315A, the transmission buffer 1312A, the store-and-forward transfer controller 1316A, and the communication interface 132A in this order.

Here, the transfer path switch 1313A and the transfer path switch 1313B operate separately by the SF path enable signals 1306A and 1306B from the cyclic transmission controller 130. As discussed above, according to the present embodiment, the transfer path switches 1313A and 1313B configured to separately operate to switch the transfer method are provided in the uplink and the downlink relay paths of each industrial network apparatus 1. This allows the industrial network apparatus 1 to apply the different transfer methods for the uplink relay path and the downlink relay path at the same time.

It is noted that which of the communication interfaces 132A and 132B is connected to the upstream node and which is connected to the downstream node is determined by the cyclic transmission controller 130 based on the fact that the known data transmitted from the master M is received by which of the communication interface 132A or 132B.

Specifically, when the received data stored in the FIFO reception buffer 1310A is the known data from the master M at the timing when the reception notification signal 1318A is input to the reception controller 1303 of the cyclic transmission controller 130, it is determined that the path from the communication interface 132B to the communication interface 132A is the upstream. Also, when the received data stored in the FIFO reception buffer 1310B is the known data from the master M at the timing when the reception notification signal 1318B is input to the reception controller 1303 of the cyclic transmission controller 130, it is determined that the path from the communication interface 132A to the communication interface 132B is the upstream. Such identification may be performed before the start of the cyclic transmission. As discussed above, the industrial network apparatus 1 of the present embodiment provides the connection of the communication interfaces 132A and 132B, which allows the industrial network apparatus 1 to determine by itself the direction of the upstream and the downstream.

The data transmission in the industrial network exemplified in FIG. 2 will be described here in a further specific manner. FIG. 7 is a timing chart illustrating the data transmission in the industrial network of FIG. 2. As illustrated in the figure, each transmission cycle 141 contains four bands (periods) of a synchronization notification band, a command transmission band, a response transmission band, and a message transmission band in this order. The synchronization notification band is a band for synchronizing the slaves S1 to S3 with the master M based on the synchronization notification S transmitted from the master M. This synchronization notification band allows for the same start time of the transmission cycles 141 of the master M and the slaves S1 to S3. It is noted that the method disclosed in the IEEE 1588 (the IEEE standard for a Precision Clock Synchronization Protocol for Networked Measurement and Control Systems) may be employed as the synchronization method. When the IEEE 1588 is employed, the synchronization notification S is "Sync Message". The measurement of the transmission delay in which "Delay Request" or "Delay Response" of the IEEE 1588 is used may be performed before the start of the cyclic transmission illustrated in FIG. 7.

In the response transmission band, the master M and the slaves S1 to S3 set both uplink relay path and downlink relay path to the cut-through transfer path (the second path). Further, in the message transmission band, the master M and the slaves S1 to S3 set both uplink relay path and downlink relay path to the store-and-forward transfer path (the third path). Further, in the synchronization notification band and the command transmission band, the master M and the slaves S1 to S3 set the uplink relay path to the store-and-forward transfer path (the third path) and set the downlink relay path to the cut-through transfer path (the second path).

That is, in the downlink path, the synchronization notification band, the command transmission band, and the response transmission band correspond to the priority transmission period (the band employing the cut-through method). Also in the downlink path, the message transmission band corresponds to the non-priority transmission period (the band employing the store-and-forward method). Further, in the uplink path, the response transmission band corresponds to the priority transmission period. In the uplink path, the message transmission band, the synchronization notification band (of the next cycle), and the command transmission band correspond to the non-priority transmission period.

Then, in the cut-through band (the priority transmission period), the master M and the slaves S1 to S3 transmit the control data such as the commands (represented as 1C to 3C in FIG. 7) or the responses (represented as 1R to 3R in FIG.

7), or the synchronization notification S. The industrial network apparatus 1 of the master M generates, at the host CPU 10, the command 1C addressed to the slave S1, the command 2C addressed to the slave S2, and the command 3C addressed to the slave S3. The industrial network apparatus 1 of the master M transmits these commands 1C to 3C to the slave S1 in the command transmission band. The slaves S1 and S2 transfer these commands 1C to 3C to the downstream nodes. Further, each host CPU 10 of the industrial network apparatus 1 of the slaves S1 to S3 generates the responses 1R to R3 addressed to the master M. The responses 1R to 3R correspond to the commands 1C to 3C, respectively. The slaves S1 to S3 transmit the response generated by the self-nodes to two nodes of the upstream side and the downstream side in the response transmission band. Further, the responses 1R to 3R received by the node in one of the upstream side and the downstream side are transferred to the node in the other side. This allows the master M to receive the responses 1R to 3R corresponding to the commands 1R to 3R. Further, each of the slaves S1 to S3 is able to recognize what command other slaves have received from the master M and what response they have sent back to the master M.

On the other hand, in the store-and-forward band (the non-priority transmission period), the master M and the slaves S1 to S3 calculate the remaining time of the band and the time required for the transfer of the received data, at the timing of the reception of the entire data. When the remaining time of the store-and-forward band (the non-priority transmission period) is sufficient for the transfer of the received data, the master M and the slaves S1 to S3 transfer the received data. In contrast, when the remaining time is less than the sufficient time for the transfer of the received data, the master M and the slaves S1 to S3 do not transfer the received data and wait the next store-and-forward band to come. This allows the message to be transmitted without affecting the transmission cycle of the control data.

The timing chart of FIG. 7 illustrates the example in which the slave S3 transmits the message data Msg1 to the master M and the master M transmits the message data Msg2 to the slave S2. In this example, it is difficult to transfer the message data Msg2, which has been transmitted by the master M in the message transmission band of the transmission cycle Cyc1, in the remaining time of the same band (the remaining time of the non-priority transmission period for the downlink path). Therefore, the slave S1 holds the message data Msg2. The slave S1 starts the transmission of the message data Msg2 to the slave S2 at the start time of the message transmission band in the next transmission cycle Cyc2 (the start time of the next non-priority transmission period for the downstream path). Here, because the message data Msg2 is addressed to the self-node, the slave S2 does not transfer the message data Msg2 to the slave S3 or its post stage.

On the other hand, the message data Msg1, which has been transmitted by the slave S3 in the synchronization notification band and the command transmission band of the transmission cycle Cyc2, can be transferred up to the slave S1 within the command transmission band. However, it is difficult to further transfer the message data Msg1 from the slave S1 to the master M in the remaining time of the same band (the remaining time of the non-priority transmission period for the upstream path). Therefore, the slave S1 starts the transmission to the master M at the start time of the message transmission band (the start time of the next non-priority transmission period for the upstream path).

Here, described will be the operation of the cyclic transmission controller 130 of the industrial network apparatus 1 of the master M and the cyclic transmission controller 130 of the industrial network apparatus 1 of the slaves S1 to S3. It is noted that the transmission and reception controller 131 of the master M and that of the slaves S1 to S3 make the same operation.

Figure 8:
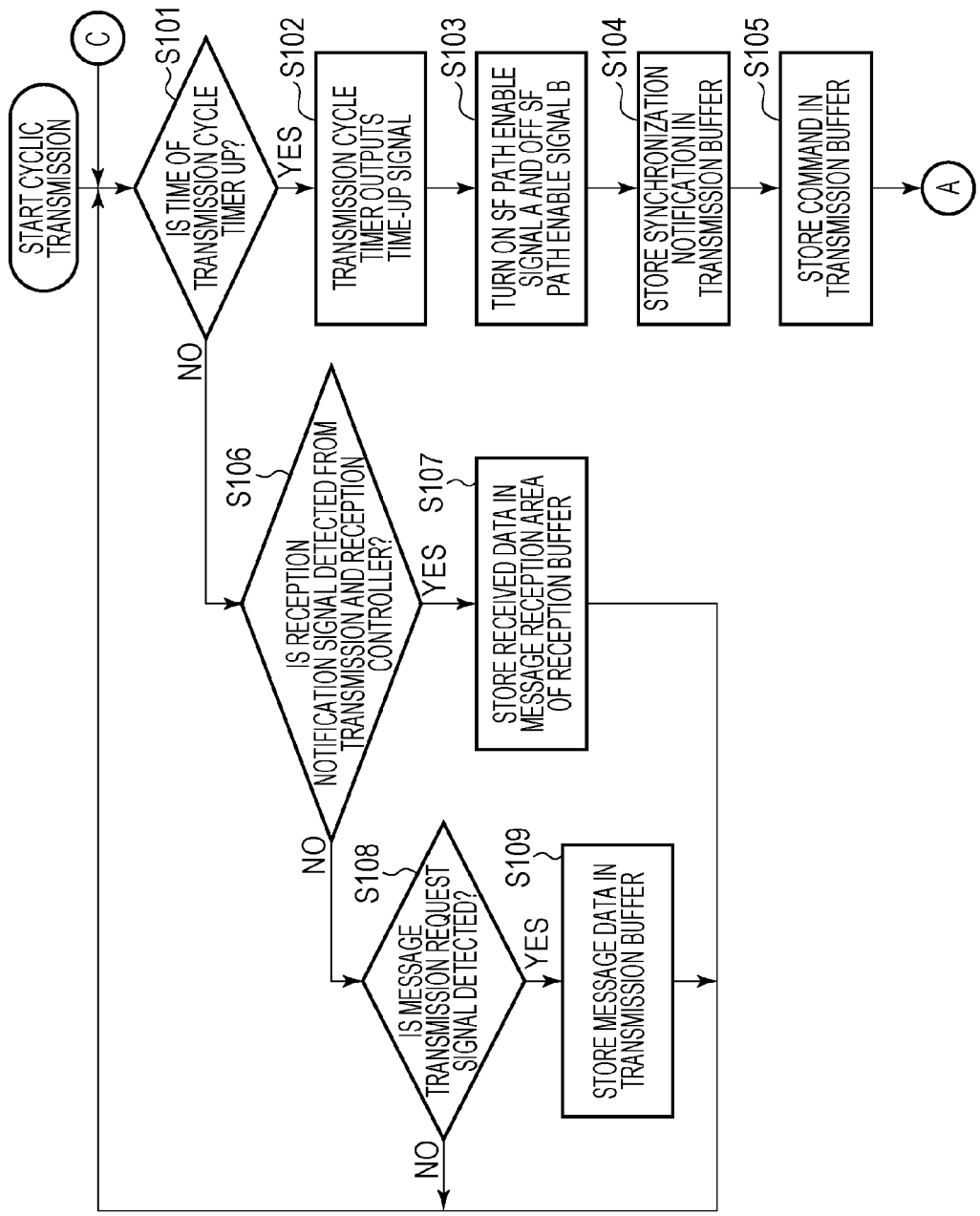
FIG. 8 is a flowchart illustrating operation of the cyclic transmission controller of the industrial network apparatus used as a master (a controller)
Figure 9:
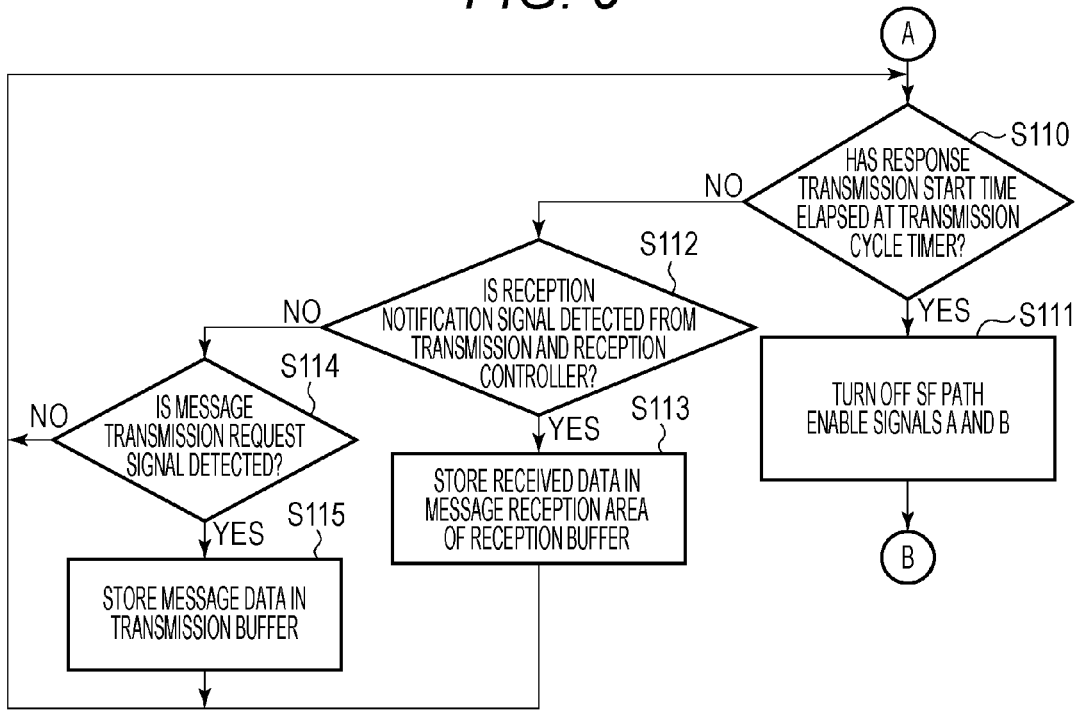
FIG. 9 is a flowchart illustrating the operation of the cyclic transmission controller of the industrial network apparatus used as a master (a controller)
Figure 10:
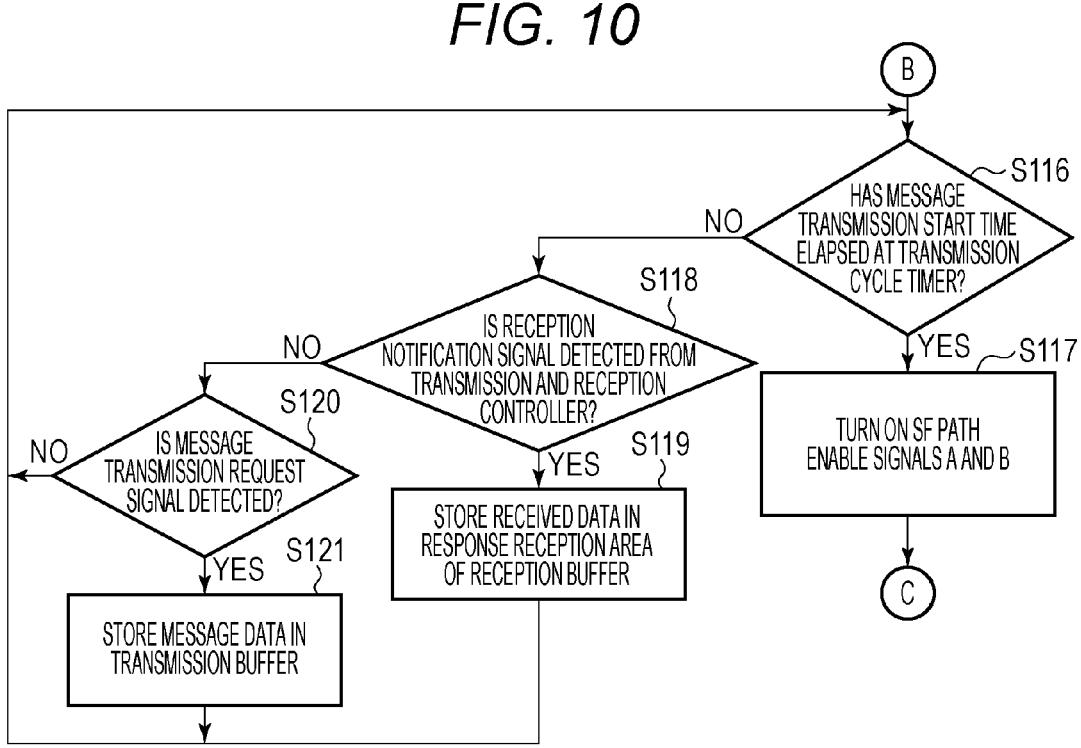
FIG. 10 is a flowchart illustrating the operation of the cyclic transmission controller of the industrial network apparatus used as a master (a controller)

FIG. 8 to FIG. 10 are flowcharts illustrating the operation during the cyclic transmission of the cyclic transmission controller 130 of the master M. The operation condition is that the transmission cycle 141, the command transmission start time 142, the response transmission start time 143, and the message transmission start time 144 have been stored in the cyclic transmission information storage 14 in advance. Further, the transmission cycle timer 1301 has been started up.

In FIG. 8, in the cyclic transmission controller 130 of the master M, when the time of the transmission cycle timer 1301 is up and the transmission cycle ends (S101: Y (Yes)), the transmission cycle timer 1301 outputs the timing signal 1305 indicating that the time is up to the transfer path manager 1304 and the transmission controller 1302 (S102). In response, the transfer path manager 1304 turns on the SF path enable signal 1306A and turns off the SF path enable signal 1306B (S103). This causes the relay method of the downlink relay path to be the cut-through method, while causing the relay method of the uplink relay path to be the store-and-forward method. It is noted that, in the configuration example of FIG. 2, the communication interface 132A of the master M does not relay the data of the uplink direction because of not being connected to the industrial network apparatus 1 of the slaves S1 to S3. Therefore, the transfer path manager 1304 may turn off the SF path enable signals 1306A and 1306B together.

Next, the transmission controller 1302 stores the synchronization notification S in the transmission buffer 1311B of the transmission and reception controller 131 (S104). It is noted that the synchronization notification S may be stored also in the transmission buffer 1311A. Subsequently, the transmission cycle timer 1301 outputs the timing signal 1305 indicating that the command transmission start time 142 has come. In response, the transmission controller 1302 stores the commands 1C to 3C (the control data), which have been stored in the transmission buffer 11, in the transmission buffer 1311B of the transmission and reception controller 131 (S105). It is noted that the commands 1C to 3C may be stored also in the transmission buffer 1311A. Then, the transmission controller 1302 waits for the current time of the transmission cycle timer 1301 to be the response transmission start time 143.

Before the response transmission start time 143 comes after the start of the transmission cycle, the message data may be transmitted from the industrial network apparatus 1 of the slave S1 (see FIG. 7). Therefore, when the reception notification signal 1318B is input (detected) from the transmission and reception controller 131 (FIG. 9, S112: Y), the reception controller 1303 obtains the received data from the reception buffer 1310B of the transmission and reception controller 131. The reception controller 1303 then stores the received data in the message data reception area of the reception buffer 12 (S113). The host CPU 10 executes various kinds of data processing based on the stored message data. Meanwhile, the transmission controller 1302 may receive (detect) the request signal 1307 of the message data transmission from the host CPU 10 (S114: Y). In this case, the transmission controller 1302 stores the message data, which has been stored in the message data transmission area of the transmission buffer 11, in the transmission buffer 1312B of the transmission and reception controller 131 (S115).

When the current time of the transmission cycle timer 1301 reaches the response transmission start time 143 (S110: Y), the transfer path manager 1304 of the master M turns off both SF path enable signals 1306A and 1306B (S111). This causes the relay path of the transmission and reception controller 131 to apply the cut-through method for both uplink and downlink. Then, the transmission cycle timer 1301 waits for the current time to be the message transmission start time 144.

Within the time from the response transmission start time 143 to the message transmission start time 144, the response may be transmitted from the industrial network apparatus 1 of the slave 51 (see FIG. 7). Therefore, as illustrated in FIG. 10, when the reception notification signal 1318B is input (detected) from the transmission and reception controller 131 to the reception controller 1303 (S118: Y), the reception controller 1303 obtains the received data from the reception buffer 1310B of the transmission and reception controller 131. The reception controller 1303 then stores the received data in the response reception area of the reception buffer 12 (S119). Meanwhile, when the transmission controller 1302 receives (detects) the request signal 1307 of the message data transmission from the host CPU 10 (S120: Y), the transmission controller 1302 stores the message data, which has been stored in the message data transmission area of the transmission buffer 11, in the transmission buffer 1312B of the transmission and reception controller 131 (S121).

When the current time of the transmission cycle timer 1301 reaches the message transmission start time 144 (S116: Y), the transfer path manager 1304 of the master M turns on both SF path enable signals 1306A and 1306B (S117). This causes the uplink and the downlink relay paths of the transmission and reception controller 131 to apply the store-and-forward method. Then, the transmission cycle timer 1301 waits for the time to be up.

As illustrated in FIG. 8, within the time from the message transmission start time 144 to the completion of the transmission cycle, the reception notification signal 1318B may be input from the transmission and reception controller 131 (S106: Y). In this case, the reception controller 1303 obtains the received data from the reception buffer 1310B of the transmission and reception controller 131. The reception controller 1303 then stores the received data in the message data reception area of the reception buffer 12 (S107). Meanwhile, upon receiving (detecting) the request signal 1307 of the message data transmission from the host CPU 10 (S108: Y), the transmission controller 1302 stores the message data, which has been stored in the message data transmission area of the transmission buffer 11, in the transmission buffer 1312B of the transmission and reception controller 131 (S109). When the time is up at the transmission cycle timer 1301, the above operations (S101 to S121) are then repeated.

Figure 11:
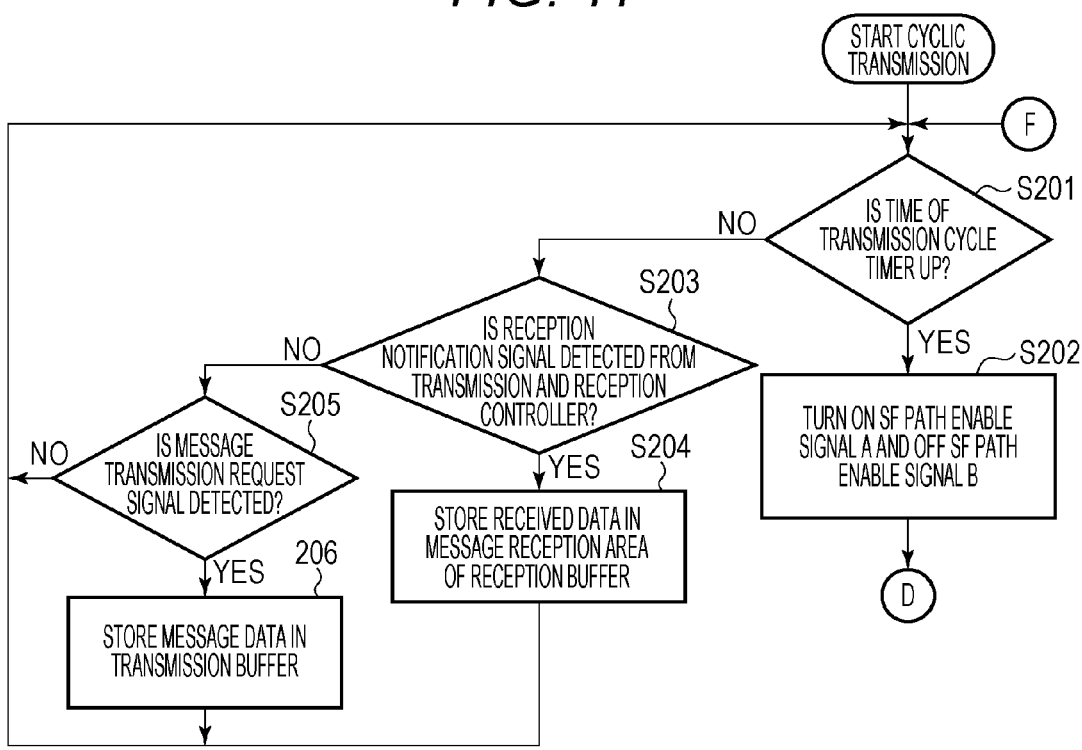
FIG. 11 is a flowchart illustrating the operation of the cyclic transmission controller of the industrial network apparatus used as a slave (an industrial device)
Figure 12:
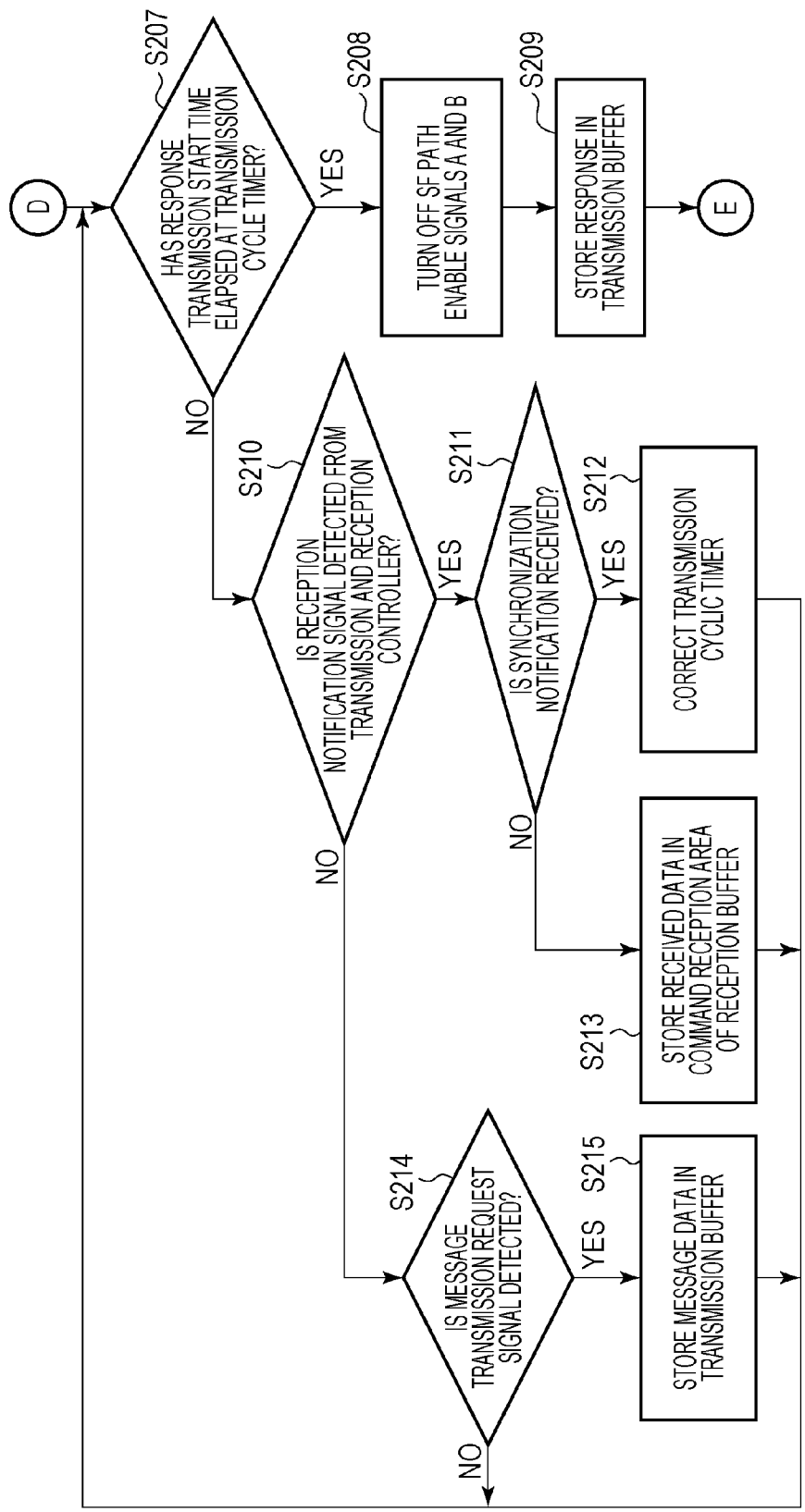
FIG. 12 is a flowchart illustrating the operation of the cyclic transmission controller of the industrial network apparatus used as a slave (an industrial device)
Figure 13:
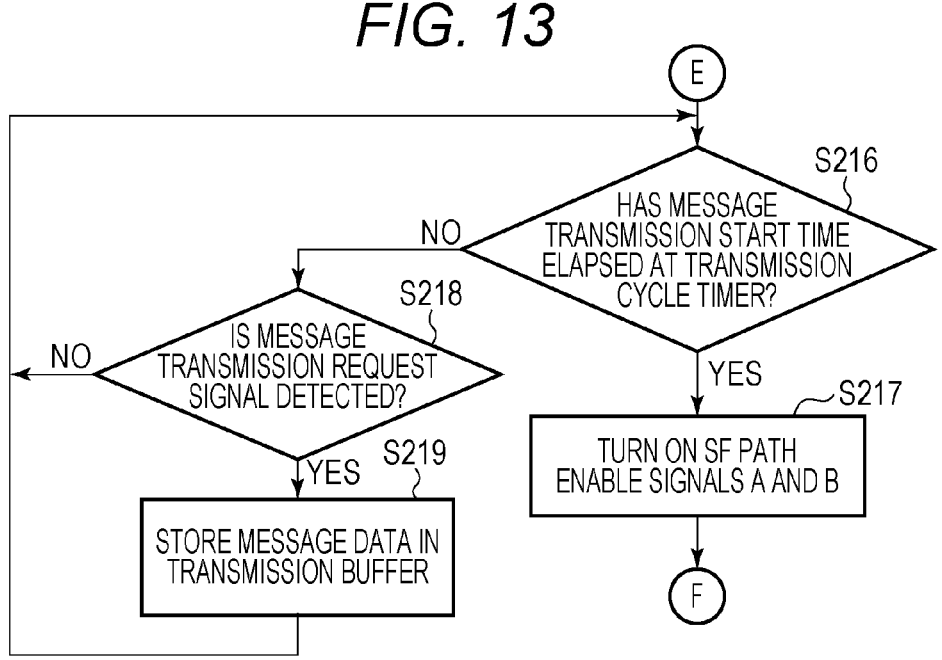
FIG. 13 is a flowchart illustrating the operation of the cyclic transmission controller of the industrial network apparatus used as a slave (an industrial device)

Next, FIG. 11 to FIG. 13 are flowcharts illustrating the operation during the cyclic transmission of the cyclic transmission controller 130 of the slaves S1 to S3. The operation condition is that the transmission cycle 141, the command transmission start time 142, the response transmission start time 143, and the message transmission start time 144 have been stored in the cyclic transmission information storage 14 in advance. Further, the transmission cycle timer 1301 has been started up. Similarly to the case of the master M, the time of the transmission cycle timer 1301 is up in the transmission cycle 141 and it is auto-reloaded (restarted).

Firstly, in the cyclic transmission controllers 130 of the slaves 51 to S3, when the time of the transmission cycle timer 1301 is up and the transmission cycle ends (S201: Y), the transmission cycle timer 1301 outputs the timing signal 1305 indicating that the time is up to the transfer path manager 1304 and the transmission controller 1302. In response, the transfer path manager 1304 turns on the SF path enable signal 1306A and turns off the SF path enable signal 1306B. This causes the relay method of the downlink relay path to be the cut-through method and the relay method of the uplink relay path to be the store-and-forward method (S202).

Next, as illustrated in FIG. 12, the process waits for the current time of the transmission cycle timer 1301 to reach the response transmission start time 143. Within the time from the start of the transmission cycle to the response transmission start time 143, the reception notification signal 1318A or 1318B may be input (detected) from the transmission and reception controller 131 (S210: Y). In this case, the reception controller 1303 of the cyclic transmission controller 130 obtains the received data from the reception buffer 1310A or 1310B of the transmission and reception controller 131. When the obtained received data is the synchronization notification S (S211: Y), the reception controller 1303 then corrects the transmission cycle timer 1301 based on the information stored in the synchronization notification S (S212). When the received data is not the synchronization notification S (S211: N (No)), the reception controller 1303 stores the received data in the command reception area of the reception buffer 12 (S213).

Further, upon receiving the request signal 1307 of the message data transmission from the host CPU 10 within the time from the start of the transmission cycle to the response transmission start time 143 (S214: Y), the transmission controller 1302 stores the message data, which has been stored in the message data transmission area of the transmission buffer 11, in the transmission buffers 1312A and 1312B of the transmission and reception controller 131 (S215). It is noted that the transmission controller 1302 may manage which side of the communication interface 132A or 132B the destination node is connected to. In this case, the transmission controller 1302 may store the message data, only in the transmission buffer 1312A or 1312B corresponding to the communication interface 132A or 132B that is able to communicate with the destination node.

When the current time of the transmission cycle timer 1301 reaches the response transmission start time 143 (S207: Y), the transfer path managers 1304 of the slaves S1 to S3 turn off both SF path enable signal 1306A and SF path enable signal 1306B. This causes the uplink and the downlink relay paths of the transmission and reception controller 131 to apply the cut-through method (S208). Furthermore, the transmission controller 1302 of each of the slaves S1 to S3 stores the response, which has been stored in the transmission buffer 11, in the transmission buffer 1311A and transmission buffer 1311B of the transmission and reception controller 131 (S209). Then, the process waits the current time of the transmission cycle timer 1301 to apply the message transmission start time 144.

As illustrated in FIG. 13, within the time from the response transmission start time 143 to the message transmission start time 144, the transmission controller 1302 may receive (detect) the request signal 1307 of the message data transmission from the host CPU 10 (S218: Y). In this case, the transmission controller 1302 stores the message data, which has been stored in the message data transmission area of the transmission buffer 11, in the transmission buffers 1312A and 1312B of the transmission and reception controller 131 (S219). In addition, in this case, the transmission controller 1302 may manage which side of the communication interface 132A or 132B the destination node is connected to. In this case, the transmission controller 1302 may store the message data, only in the transmission buffer 1312A or 1312B corresponding to the communication interface 132A or 132B that is able to communicate with the destination node.

When the current time of the transmission cycle timer 1301 reaches the message transmission start time 144 (S216: Y), the transfer path manager 1304 of the slaves S1 to S3 turn on both SF path enable signal 1306A and SF path enable signal 1306B. This causes the uplink and the downlink relay paths of the transmission and reception controller 131 to be of the store-and-forward method (S217). Then, the process waits the time of the transmission cycle timer 1301 to be up.

As illustrated in FIG. 11, within the time from the message transmission start time 144 to the end of the transmission cycle, the reception notification signal 1318A or 1318B may be input (detected) from the transmission and reception controller 131 (S213: Y). In this case, the reception controller 1303 of the cyclic transmission controller 130 obtains the received data from the reception buffer 1310A or the reception buffer 1310B of the transmission and reception controller 131, and stores it in the message data reception area of the reception buffer 12 (S204). Meanwhile, upon receiving the request signal 1307 of the message data transmission from the host CPU 10 (S205: Y), the transmission controller 1302 stores the message data, which has been stored in the message data transmission area of the transmission buffer 11, in the transmission buffers 1312A and 1312B of the transmission and reception controller 131, (S206). In addition, in this case, the transmission controller 1302 may manage which side of the communication interface 132A or 132B the destination node is connected to. In this case, the transmission controller 1302 may store the message data, only in the transmission buffer 1312A or 1312B corresponding to the communication interface 132A or 132B that is able to communicate with the destination node. When the time of the transmission cycle timer 1301 is up, then the above-described operations are repeated.

According to the above-described embodiment, the synchronization notification band is provided in the data transmission period, and the synchronization notification S is transferred by the cut-through method. This can reduce the fluctuation of the reception time of the synchronization notification S in the slaves S1 to S3, which allows for the accurate synchronization adjustment. As a result, all the master M and the slaves S1 to S3 are able to time the accurate transmission cycle, so that the manipulation accuracy can be improved.

Further, according to the present embodiment, the command transmission band is provided in the data transmission period, and the command is transferred by the cut-through method. This allows the command transmission to be guaranteed for each transmission cycle. Furthermore, the transmission delay from the transmission by the master M to the reception at the slaves S1 to S3 can be reduced or cut. Similarly, according to the present embodiment, the response transmission band is provided in the data transmission period, and the response is transferred by the cut-through method. This allows the response transmission to be guaranteed for each transmission cycle. Furthermore, the transmission delay from the transmission by the slaves S1 to S3 to the reception at the master M can be reduced or cut. Further, both transmission delays for the command and the response can be reduced allowing for the reduced takt time.

Furthermore, according to the present embodiment, the non-priority transmission period including the message transmission band is provided in the data transmission period, and the message data is transferred by the store-and-forward method. This can restrain or keep the transmission of the synchronization notification S or the control data from being affected by the message data in response to the transmission request at a particular timing. In particular, by timing the remaining time of the non-priority transmission period, each node relaying the message data determines whether or not to transfer the message data. This can restrain or keep the message data from being transmitted in the priority transmission period. This can ensure the transmission of the synchronization notification S or the control data. As a result, the manipulation accuracy can be improved.

Further, the message transmission is made in the uplink path in the synchronization notification band and the command transmission band, which allows for the improved utilization ratio of the band. As a result, the expansion of the transmission cycle due to the message transmission is restrained. Further, in the synchronization notification band and the command transmission band, no token is transmitted, in contrast to the conventional FL-net. It is thus unnecessary for each node to execute the processing of the token management. Furthermore, the problem of the expansion of the transmission cycle due to the token transmission is reduced.

Figure 14:
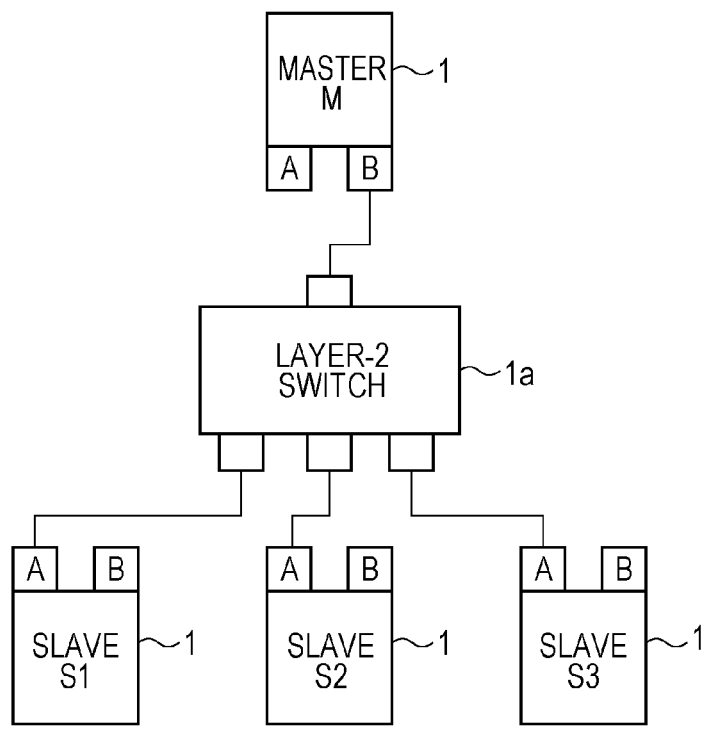
FIG. 14 is a diagram illustrating another example of the industrial network with a use of the industrial network apparatus according to the present embodiment.

It is noted that the embodiment of the present disclosure is not limited to the above-described embodiments. For example, the embodiment of the present disclosure is applicable to various topologies of the industrial network. As an example, as illustrated in FIG. 14, the embodiment of the present disclosure is also applicable to the star-type industrial network. In the example of FIG. 14, the master M and the slaves S1 to S3 are connected to a Layer-2 switch (hereafter, referred to as "switch") 1a applying the embodiment of the present disclosure and have the star configuration. Also in this modified example, the transmission path directed from the master M to the slaves S1, S2, and S3 is defined as the downlink, and the transmission path directed from the slaves S1, S2, and S3 to the master M is defined as the uplink.

The configuration of the switch 1a is basically the same as the configuration in which the elements such as the host CPU 10, the transmission buffer 11, and the reception buffer 12 that are less related to the transfer function are removed from the configuration illustrated in FIG. 1, FIG. 4, and FIG. 5. The switch 1a includes the cyclic transmission controller 130, the transmission and reception controller 131, and a plurality of communication interfaces. However, the number of the communication interfaces is larger than that of the master M or the slaves S1 to S3. Further, the data received by any one of the communication interfaces is transmitted from all of the other communication interfaces. That is, multiple parallel relay paths are provided inside the switch 1a. The operation of the switch 1a is basically the same as the operation of the slave S1 or slave S2 illustrated in FIG. 2. They are different, however, in that the received data is transferred to other nodes from each of other communication interfaces than the communication interface which has received that received data.

Further, the destination address of the control data such as the command or the response may be the broadcast address. In this case, in addition to the control data, the identification information of the node that is the destination of that control data is contained in the data field of the Ethernet frame. This allows the control data to be transferred to all the nodes of the industrial network. This allows for easier set-up and maintenance of the industrial network.

It is noted that in the present embodiment a priority transmission period and a non-priority transmission period in the uplink communication (communication from the slave S1, S2 and S3 to the master M) are referred to as the first priority transmission period and the first non-priority transmission period, respectively.

Furthermore, a priority transmission period and a non-priority transmission period in the downlink communication (communication from the master M to the slave S1, S2 and S3) are referred to as the second priority transmission period and the second non-priority transmission period, respectively.

However, the designations of the priority transmission period and the non-priority transmission period are not limited to these terms, respectively.

Specifically, the priority transmission period and the non-priority transmission period in the uplink communication may be referred to as the second priority transmission period and the second non-priority transmission period, respectively.

Moreover, the priority transmission period and the non-priority transmission period in the downlink communication may be referred to as the first priority transmission period and the first non-priority transmission period, respectively.

Furthermore, the industrial device, the controller, the data transfer method, and the data transmission method of the present disclosure may be the following first to tenth industrial devices, first controller, first data transfer method, and first data transmission method.

The first industrial device is an industrial device connected to an industrial network together with a controller and another industrial device. The industrial device includes a control data relay that, in a priority transmission period that occurs by a fixed cycle, receives control data transmitted from one of the controller and the another industrial device addressed to the other and starts transmission of the control data addressed to the other, and a message data relay that, in a non-priority transmission period that is different from the priority transmission period, receives message data transmitted from the one of the controller and the another industrial device addressed to the other and starts transmission of the message data to the other depending on a required transmission time of the message data and remaining time of the non-priority transmission period.

In the second industrial device in the first industrial device, before receiving the entire control data, the control data relay starts transmission of the control data addressed to the other.

In the third industrial device in the second industrial device, the control data relay transmits the control data by a cut-through method.

In the fourth industrial device in any one of the first to third industrial devices, after receiving the entire message data, the message data relay starts transmission of the message data addressed to the other.

In the fifth industrial device in the fourth industrial device, the message data relay transmits the message data by a store-and-forward method.

In the sixth industrial device in any one of the first to fifth industrial devices, the message data has a variable length.

The seventh industrial device in any one of the first to sixth industrial devices includes a synchronizer that synchronizes the priority transmission period and the non-priority transmission period with respect to the controller.

The eighth industrial device in any one of the first to seventh industrial devices further includes a second control data relay that, in a second priority transmission period that occurs by a fixed cycle, receives control data addressed and transmitted to the one of the controller and the another industrial device from the other and starts transmission of the control data addressed to the one, and a second message data relay that, in a second non-priority transmission period that is different from the second priority transmission period, receives message data addressed and transmitted to the one of the controller and the another industrial device from the other and starts transmission of the message data addressed to the one depending on a required transmission time of the message data and remaining time of the second non-priority transmission period.

In the ninth industrial device in any one of the first to eighth industrial device, the control data relay and the message data relay transmit the control data and the message data by storing the control data or the message data in a frame transmitted by a common transmission medium.

The tenth industrial device is an industrial device communicably connected to an industrial network together with the controller. The industrial device includes a control data transmitter that starts transmission of control data addressed to the controller in a priority transmission period that occurs by a fixed cycle, and a message data transmitter that starts transmission of message data addressed to the controller in a non-priority transmission period that is different from the priority transmission period depending on a required transmission time of the message data and remaining time of the non-priority transmission period.

The first controller is a controller communicably connected to an industrial network together with an industrial device. The controller includes a control data transmitter that starts transmission of control data addressed to the industrial device in a priority transmission period that occurs periodically, and a message data transmitter that starts transmission of message data addressed to the industrial device in a non-priority transmission period that is different from the priority transmission period depending on a required transmission time of the message data and remaining time of the non-priority transmission period.

The first data transfer method includes, in a priority transmission period that occurs by a fixed cycle, receiving priority data transmitted from a first network node and starting transmission of the priority data addressed to a second network node, and, in a non-priority transmission period that is different from the priority transmission period, starting transmission of the non-priority data addressed to the second network node depending on a required transmission time of the non-priority data and remaining time of the non-priority transmission period.

The first data transmission method includes, in a priority transmission period that occurs by a fixed cycle, starting transmission of priority data addressed to another network node, and, in a non-priority transmission period that is different from the priority transmission period, starting transmission of the non-priority data addressed to the another network node depending on a required transmission time of the non-priority data and remaining time of the non-priority transmission period.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. An industrial network apparatus comprising:
an upstream communication interface;
a downstream communication interface;
a control data communicator configured to receive and transmit control data in a priority transmission period that occurs periodically, and configured to start a transmission of received control data during the priority transmission period before the entire control data is received for every transmission of received control data that includes a command; and
a message data communicator configured to determine whether or not to start transmission of message data in a non-priority transmission period that is different from the priority transmission period depending on a required transmission time of message data and remaining time of the non-priority transmission period, and to transmit the message data when determining to start transmission of the message data, wherein
the message data communicator is configured to transmit message data via the upstream communication interface such that the message data is transmitted in a period of time that overlaps the transmission of control data by the control data communicator.

2. The industrial network apparatus according to claim 1, which is connected to an industrial network together with a controller and another industrial device, wherein
the priority transmission period includes a first priority transmission period for transmitting control data from one of the controller and the industrial device addressed to the other,
the non-priority transmission period includes a first non-priority transmission period for transmitting message data from one of the controller and the industrial device addressed to the other,
the control data communicator includes a first control data relay configured to receive control data transmitted from one of the controller and the industrial device addressed to the other and transmit the control data addressed to the other in the first priority transmission period,
the message data communicator includes a first message data relay configured to receive message data transmitted from the one of the controller and the industrial device addressed to the other and transmit the message data addressed to the other in the first non-priority transmission period, and
the first message data relay determines whether or not to start transmission of the message data addressed to the other depending on a required transmission time of the message data and remaining time of the first non-priority transmission period.

3. The industrial network apparatus according to claim 2, wherein the first control data relay starts the transmission of the control data addressed to the other.

4. The industrial network apparatus according to claim 3, wherein the first control data relay transmits the control data by a cut-through method.

5. The industrial network apparatus according to claim 2, wherein the first message data relay starts transmission of the message data addressed to the other after receiving the entire message data.

6. The industrial network apparatus according to claim 5, wherein the first message data relay transmits the message data by a store-and-forward method.

7. The industrial network apparatus according to claim 1, wherein the message data has a variable length.

8. The industrial network apparatus according to claim 2, comprising a synchronizer configured to synchronize the first priority transmission period and the first non-priority transmission period with respect to the controller.

9. The industrial network apparatus according to claim 2, wherein
the priority transmission period includes a second priority transmission period for transmitting control data addressed to the one of the controller and the industrial device from the other,
the non-priority transmission period includes a second non-priority transmission period for transmitting message data addressed to the one of the controller and the industrial device from the other,
the control data communicator includes a second control data relay configured to receive control data addressed and transmitted to the one of the controller and the industrial device from the other and transmit the control data addressed to the one in the second priority transmission period,
the message data communicator includes a second message data relay configured to receive message data addressed and transmitted to the one of the controller and the industrial device from the other and transmit the message data addressed to the one in the second non-priority transmission period, and
the second message data relay determines whether or not to start transmission of the message data addressed to the one depending on a required transmission time of the message data and remaining time of the second non-priority transmission period.

10. The industrial network apparatus according to claim 1, wherein the control data communicator and the message data communicator transmit the control data and the message data by storing the control data or the message data in a frame transmitted by a common transmission medium.

11. The industrial network apparatus according to claim 1, which is communicably connected to an industrial network together with a controller, wherein
the control data communicator includes a first control data transmitter configured to transmit the control data addressed to the controller in the priority transmission period,
the message data communicator includes a first message data transmitter configured to transmit the message data addressed to the controller in the non-priority transmission period, and
the first message data transmitter determines whether or not to start transmission of the message data addressed to the controller depending on a required transmission time of the message data and remaining time of the non-priority transmission period.

12. The industrial network apparatus according to claim 1, which is communicably connected to an industrial network together with an industrial device, wherein the control data communicator includes a second control data transmitter configured to transmit the control data addressed to the industrial device in the priority transmission period, the message data communicator includes a second message data transmitter configured to transmit the message data addressed to the industrial device in the non-priority transmission period, and the second message data transmitter determines whether or not to start transmission of the message data addressed to the industrial device depending on a required transmission time of the message data and remaining time of the non-priority transmission period.

13. The industrial network apparatus according to claim 1, wherein the control data communicator is configured to receive and transmit the control data in a transmission cycle and the message data communicator is configured to transmit the message data in the transmission cycle, and wherein the priority transmission period occurs prior to the non-priority transmission period in the transmission cycle.

14. The industrial network apparatus according to claim 13, wherein the message data communicator is configured to transmit the message data during both the priority transmission period and the non-priority transmission period after receiving the entire message data.

15. The industrial network apparatus according to claim 1, wherein the control data communicator is configured to transmit control data including a response during the priority transmission period, the response being transmitted according to a successful receipt of at least one command received during the priority transmission period.

16. The industrial network apparatus according to claim 1, wherein the control data communicator is configured to start the transmission of received control data via the downstream communication interface before the entire control data is received, and wherein the message data communicator is configured to transmit message data in a second non-priority transmission period such that the transmission of message data in the second non-priority transmission period overlaps the transmission of control data by the control data communicator.

17. A data communication method comprising:

transmitting priority data by an industrial network apparatus that includes an upstream communication interface and a downstream communication interface in a priority transmission period that occurs periodically;

determining whether or not to start transmission of non-priority data in a non-priority transmission period that is different from the priority transmission period depending on a required transmission time of non-priority data and remaining time of the non-priority transmission period;

receiving priority data by the industrial network apparatus;

starting transmission of the received priority data by the industrial network apparatus during the priority transmission period before the entire priority data is received for every transmission of received priority data that includes a command; and transmitting the non-priority data by the industrial network apparatus when determining to start transmission of the non-priority data, the transmission of the non-priority data performed by transmitting non-priority data via the upstream communication interface in a period of time that overlaps the transmitting priority data.

18. The data communication method according to claim 17, further comprising:

receiving priority data transmitted from a first network node in the priority transmission period; and receiving non-priority data transmitted from the first network node in the non-priority transmission period, wherein the transmitting priority data includes transmitting the priority data addressed to a second network node, and the determining whether or not to start transmission of non-priority data in the non-priority transmission period includes determining whether or not to start transmission of non-priority data addressed to the second network node depending on a required transmission time of the non-priority data and remaining time of the non-priority transmission period.

19. The data communication method according to claim 17, wherein the transmitting priority data includes transmitting priority data addressed to another network node in the priority transmission period, and the determining whether or not to start transmission of non-priority data in the non-priority transmission period includes determining whether or not to start transmission of the non-priority data addressed to another network node depending on a required transmission time of the non-priority data and remaining time of the non-priority transmission period.

20. The data communication method according to claim 17, wherein the priority data is received and transmitted in a transmission cycle and the non-priority data is transmitted during the transmission cycle, and wherein the priority transmission period occurs prior to the non-priority transmission period in the transmission cycle.

21. The data communication method according to claim 20, further comprising:

transmitting the non-priority data during both the priority transmission period and the non-priority transmission period after receiving the entire message data.

22. An industrial network apparatus comprising:

an upstream communication interface;

a downstream communication interface;

control data communication means for receiving and transmitting control data in a priority transmission period that occurs periodically, and for starting a transmission of received control data during the priority transmission period before the entire control data is received for every transmission of received control data that includes a command; and message data communication means for determining whether or not to start transmission of message data in a non-priority transmission period that is different from the priority transmission period depending on a required transmission time of message data and remaining time of the non-priority transmission period, and also transmitting the message data when determining to start transmission of the message data, wherein the message data communication means is configured to transmit message data via the upstream communication interface such that the message data is transmitted in a period of time that overlaps the transmission of control data by the control data communication means.

23. The industrial network apparatus according to claim 22, wherein
the control data communication means is configured to receive and transmit the control data in a transmission cycle and the message data communication means is configured to transmit the message data in the transmission cycle, and wherein
the priority transmission period occurs prior to the non-priority transmission period in the transmission cycle.

24. The industrial network apparatus according to claim 23, wherein
the message data communication means is configured to transmit the message data during both the priority transmission period and the non-priority transmission period after receiving the entire message data.

* * * * *